United States Patent
Kiuchi et al.

(10) Patent No.: US 7,489,981 B2
(45) Date of Patent: Feb. 10, 2009

(54) ASSEMBLY LINE CONTROL SYSTEM AND IMMOBILIZER DATA PROTOCOL AND COMMUNICATION PROCESS FLOW

(75) Inventors: Yoichi Kiuchi, Newmarket (CA); Takashi Fukuda, Utsunomiya (JP); Jeanette Ye, Thornhill (CA)

(73) Assignee: Honda Motor Co., Ltd., Tokyo (JP)

( * ) Notice: Subject to any disclaimer, the term of this patent is extended or adjusted under 35 U.S.C. 154(b) by 533 days.

(21) Appl. No.: 11/211,868

(22) Filed: Aug. 25, 2005

(65) Prior Publication Data
US 2006/0066150 A1      Mar. 30, 2006

Related U.S. Application Data

(60) Provisional application No. 60/606,293, filed on Sep. 1, 2004.

(51) Int. Cl.
G06F 19/00       (2006.01)

(52) U.S. Cl. ..................... 700/116; 235/262.26

(58) Field of Classification Search ............ 700/1, 700/3, 111–115, 224–229; 701/1, 29, 33, 701/114; 235/462.24, 262.26; 445/456.5, 445/456.6

See application file for complete search history.

(56) References Cited

U.S. PATENT DOCUMENTS 5,968,108 A    10/1999   Takakura et al.

(Continued)

FOREIGN PATENT DOCUMENTS

JP            10049790         2/1998

(Continued)

Primary Examiner—Kidest Bahta
(74) Attorney, Agent, or Firm—Rankin, Hill & Clark LLP

(57) ABSTRACT

A method and related apparatus are disclosed of guaranteeing VIN registration to a vehicle's ECU. A vehicle identifier is entered into a production control system connected to a network. The entered vehicle identifier is compared with an expected vehicle identifier. If a match is obtained between the entered and expected vehicle identifiers, the vehicle identifier is sent from the production control system to a vehicle Immobilizer. A vehicle identifier acknowledgement is received at the production control system from the vehicle Immobilizer. The production control system verifies the vehicle identifier embedded in the acknowledgement. If a match is obtained, an information record associated with the vehicle identifier is sent from the production control system to the vehicle Immobilizer. An information record acknowledgement is received at the production control system from the vehicle Immobilizer. The production control system verifies the information record embedded in the acknowledgement. If a match is obtained, an authorization message is sent from the production control system to the vehicle Immobilizer. The vehicle identifier and the associated information record from the vehicle Immobilizer are written into an electronic control unit incorporated into the vehicle in response to the authorization message. The vehicle Immobilizer then continues to write other data into the vehicle's ECU. After all the writing is complete, the vehicle Immobilizer reads from the vehicle's ECU the vehicle identifier and the information record, and sends them back to the production control system for final verification. If the two pieces of information from the ECU match the two pieces of information held by the production control system, the production control system sends a complete message to the Immobilizer and records the VIN registration record in the central database. Upon receiving the complete message, the Immobilizer resumes to its ready state and the ECU data registration process is complete.

26 Claims, 20 Drawing Sheets

U.S. PATENT DOCUMENTS

| | | | |
|---|---|---|---|
| 6,542,794 B2 * | 4/2003 | Obradovich | 701/1 |
| 6,615,120 B1 * | 9/2003 | Rother | 701/33 |
| 7,117,081 B2 * | 10/2006 | Sawaoka | 701/114 |
| 2001/0029410 A1 * | 10/2001 | Obradovich | 701/1 |
| 2003/0187556 A1 * | 10/2003 | Suzuki | 701/29 |
| 2005/0065679 A1 * | 3/2005 | Kawauchi et al. | 701/29 |
| 2005/0137762 A1 * | 6/2005 | Rother | 701/29 |

FOREIGN PATENT DOCUMENTS

| | | |
|---|---|---|
| WO | 03/095276 | 11/2003 |
| WO | 2004/042673 | 5/2004 |

\* cited by examiner

ASSEMBLY LINE CONTROL SYSTEM AND IMMOBILIZER DATA PROTOCOL AND COMMUNICATION PROCESS FLOW

BACKGROUND OF THE INVENTION

In accordance with regulations established by CARB (California Air Resources Board), a vehicle's VIN (Vehicle Identification Number) must be registered to the vehicle's ECU (Electronic Control Unit). In known manufacturing processes, the VIN data for a particular vehicle is read from an external record, i.e. from a body assembly sheet or other hard copy attached to the vehicle. The VIN data is then read into an Immobilizer, a device that communicates with the vehicle ECU and writes to the ECU memory, which then writes the VIN to the ECU. In the event that an incorrect VIN is provided (i.e. vehicle assembly sheet error; improper scan; etc.) there is no procedure for detecting the error, or ensuring that the error does not occur in the first place. Thus, the Immobilizer has no capability of verifying the correct VIN data.

The manufacturing facility maintains records of information about a vehicle. Such information includes the factory vehicle specifications, specific components included in the vehicle, and a manufacturing history of the vehicle on the particular production shift. This information is collected by a computer-implemented production control system and stored in a central database. However, the known Immobilizer is not linked to the production control system, as generally indicated in FIG. 1D. Thus, there is no way to store the ECU VIN registration record in the central database.

SUMMARY OF THE INVENTION

The difficulties and drawbacks associated with previous-type systems are overcome in the present method and related apparatus to guarantee correct ECU VIN data registration. A software application is added to the production control system. The Immobilizer is linked to the new software application. A data protocol and communication process flow are developed to allow the Immobilizer and the software application to talk to each other. With this new setup, the VIN registration process is as follows: a vehicle identifier is entered into the software application connected to the production control system on a network. The entered vehicle identifier is compared with an expected vehicle identifier. If a match is obtained between the entered and expected vehicle identifiers, the vehicle identifier is sent from the software application to the vehicle Immobilizer. A vehicle identifier acknowledgement is received at the software application from the vehicle Immobilizer. The software application verifies the vehicle identifier embedded in the acknowledgement. If a match is obtained, an information record associated with the vehicle identifier is sent from the software application to the vehicle Immobilizer. An information record acknowledgement is received at the software application from the vehicle Immobilizer. The software application verifies the information record embedded in the acknowledgement. If a match is obtained, an authorization message is sent from the software application to the vehicle Immobilizer. The vehicle identifier and the associated information record from the vehicle Immobilizer are written into an electronic control unit incorporated into the vehicle in response to the authorization message. The vehicle Immobilizer then continues to write other data into the vehicle's ECU. After all the writing is complete, the vehicle Immobilizer reads from the vehicle's ECU the vehicle identifier and the information record, and sends them back to the software application for final verification. If the two pieces of information from the ECU match the two pieces of information held by the software application, the software application sends a complete message to the Immobilizer and notifies the production control system to record the VIN registration record in the central database. Upon receiving the complete message, the Immobilizer resumes to its ready state and the ECU data registration process is complete.

As will be realized, the invention is capable of other and different embodiments and its several details are capable of modifications in various respects, all without departing from the invention. Accordingly, the drawings and description are to be regarded as illustrative and not restrictive.

BRIEF DESCRIPTION OF THE DRAWINGS

FIGS. 3A, 3B, 3C, 3D, 3E, 3F, 3G, 3H, 3I, 3J, 3K, 3L, 3M, 3N, 3O and 3P show the display screens shown on the software application as used in implementing the method in accordance with the preferred embodiment.

DETAILED DESCRIPTION OF THE EMBODIMENTS

Figure 1A:
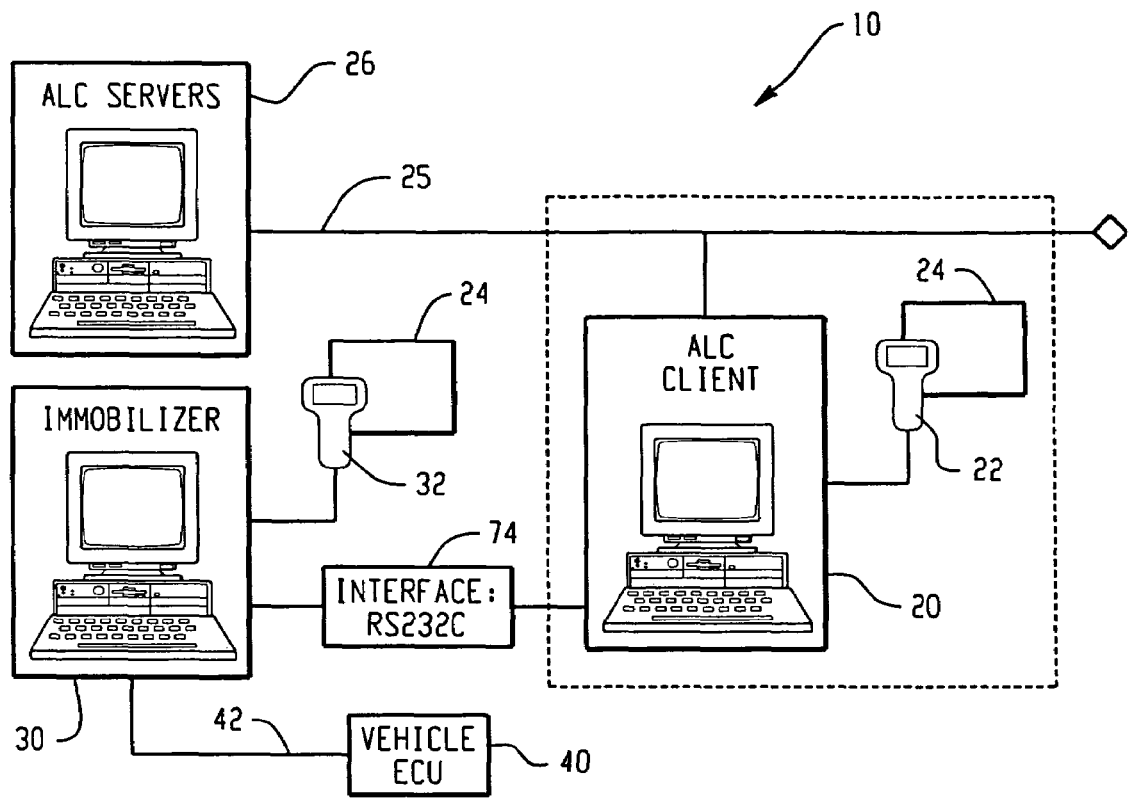
FIGS. 1A, 1B, 1C and 1D are views showing a system configuration in accordance with a preferred embodiment.
Figure 1B:
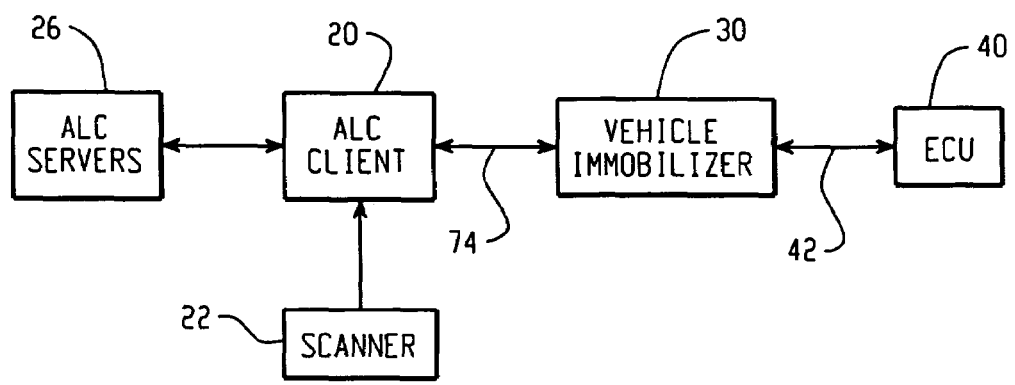
Figure 1C:
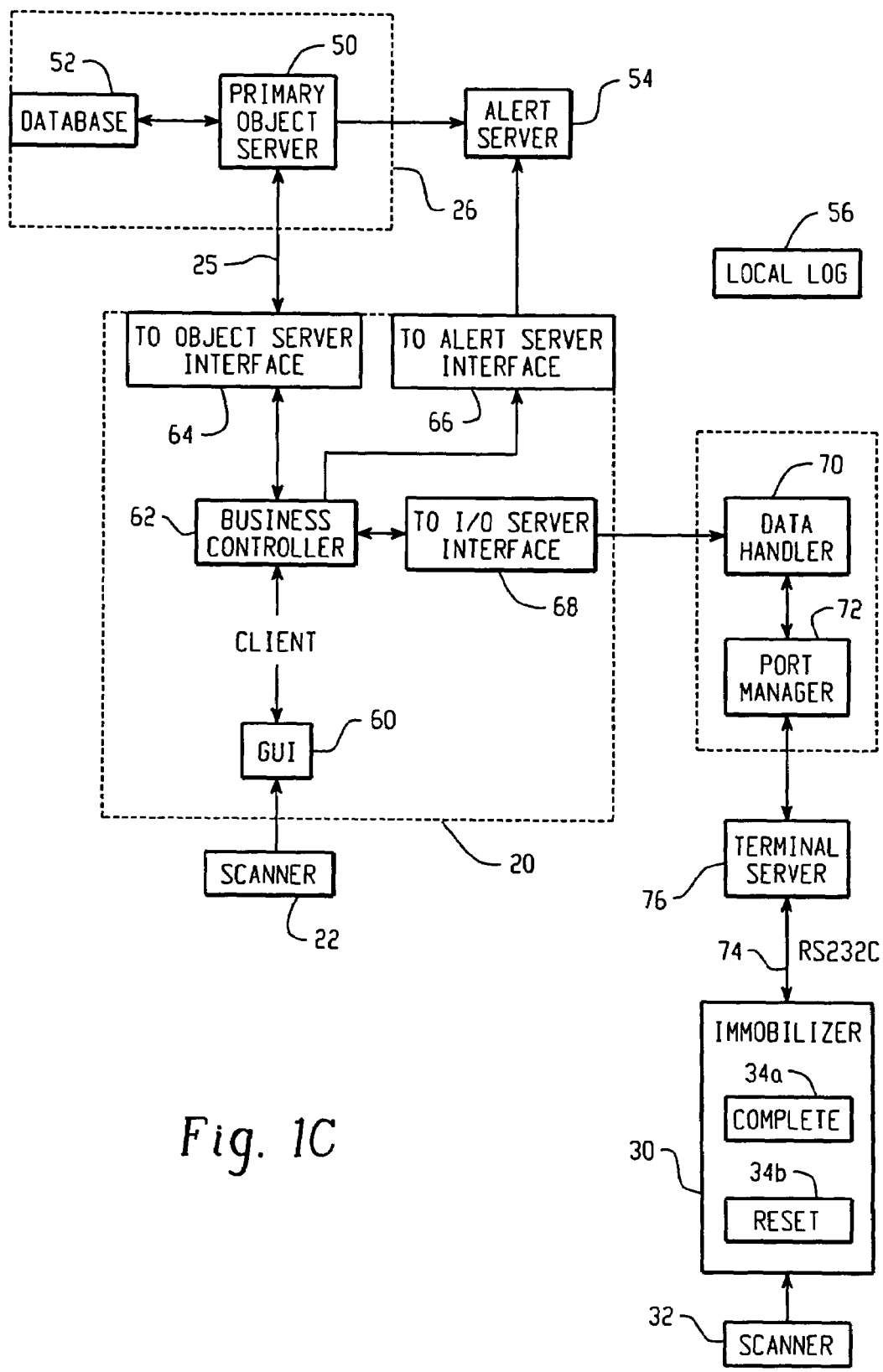

Reference will now be made to the figures, where it is understood that like reference numerals refer to like elements. FIGS. 1A, 1B and 1C depict a system 10 for registering vehicle data. A software application is provided, preferably a component of an Assembly Line Control System (ALC) called the ALC client 20 in an automotive manufacturing plant. The ALC client 20 is preferably connected to a network 25, which can be a local area network (LAN) or other suitable packet-switched network for communicating between various network systems and components. The ALC client communicates with ALC servers 26 running in the same network. The servers connect to the ALC database 52. A vehicle Immobilizer 30 is provided for encoding VIN data into an electronic control unit (ECU) 40 incorporated into the vehicle. The ALC client 20 communicates with the Immobilizer, as described hereafter. A terminal server 76 can be provided as the link between the network and the Immobilizer. However, alternate embodiments can be contemplated that do not include a terminal server 76, but can be replaced by a suitable functional equivalent.

An entering implementation 22 is included for entering a vehicle identifier into the ALC client 20. The entering implementation 22 is preferably a bar code scanner for scanning the vehicle identifier from a bar code on an assembly sheet 24 attached to the vehicle as it comes down the assembly line. Of course, it is appreciated that the data can be entered manually with a keyboard or other such interface, or can be read automatically from the vehicle, e.g. with a pre-programmed radio frequency identification device (RFID) or other such device as is known in the art. The vehicle identifier is preferably a "vehicle identification number" (VIN) such as is commonly used in automobile manufacture.

The database 52 of the ALC system includes a pre-populated table of expected vehicle identifiers and associated information records. The associated information record includes information on the model, type and options (MTO) associated with the vehicle. This information can be written to the database table upstream in the manufacturing process, in order to "pre-populate" the table. Any other suitable vehicle information can also be included without departing from the invention. The database supplies the expected VINs for use in the comparing step. In the preferred and illustrated embodiment, the ALC client 20 includes a software application that serves as an interface between the vehicle Immobilizer 30, the scanner 22 and the ALC servers 26.

In a preferred embodiment, as shown in FIG. 1C, the ALC servers 26 can include a primary object server 50 in communication with the database 52. An alert server 54 can also be used to trace the operation activity and in the event that an error with the operation occurs, as will be explained in detail below. Operation activity can be maintained on a local log 56 in the case of alert server failure. The ALC client 20 hardware can include a terminal/monitor/mouse/keyboard combination, as is known in the art. The ALC client software components can include a GUI (graphic user interface) 60 to display process messages, as will be set forth in detail below. A business controller 62 is used to coordinate the process and to handle messages between the system components. Other ALC client 20 software components include a "to object server interface" 64 for communicating with the primary object server 50, and a "to alert server interface" 66 for communicating with the alert server 54. A "to I/O server interface" 68 is provided for sending data to ALC client's data handler 70 and out through the ALC client's port manager 72.

As will be described more fully hereinafter, the ALC client 20 regulates or controls communication of data between the scanner 22, ALC servers 26 and the vehicle Immobilizer 30. For example, the ALC client 20 receives the VIN from the scanner 22 and following data verification, sends the VIN and an associated information record to the vehicle Immobilizer 30. These steps include: the ALC client 20 compares the entered or scanned VIN with an expected or stored VIN communicated from the ALC servers 26 to determine if a match is obtained; the ALC client 20 finds from its pre-populated upcoming VIN list the associated information record corresponding to the verified VIN; the ALC client 20 sends the two pieces of information to the Immobilizer respectively; the ALC client 20 also verifies data packets during packet transmissions between itself and the Immobilizer, to ensure no data corruption or data loss. The above-indicated steps of verifying, sending and further verifying are preferably computer-implemented operations, and are performed internally by the ALC client 20. These steps are preferably software implementations, but can also be performed by firmware or through hardware circuitry, or any combination thereof, without departing from the invention.

After the VIN is verified and the associated information record is mapped from the pre-populated upcoming VIN list and the vehicle Immobilizer 30 receives both pieces of information from the ALC client 20 after multiple verifications, the vehicle Immobilizer 30 performs a computer-implemented step of writing the VIN and the associated information record into the electronic control unit 40. After the writing is complete, the VIN and the associated information record are read from the ECU and passed back to the ALC client 20 for final verification. If the verification is successful, the ALC client 20 notifies the ALC servers 26 to record the VIN registration record in the database. As depicted in FIG. 1B, the vehicle Immobilizer 30 includes a communications connection 42 to the electronic control unit 40, preferably a hard-wired connection such as a communications cable or the like. A wireless connection could also be used without departing from the invention. The communications connection 42 can also include a pushbutton actuator for actuating the Immobilizer 30 to initiate the step of writing.

Figure 1D:
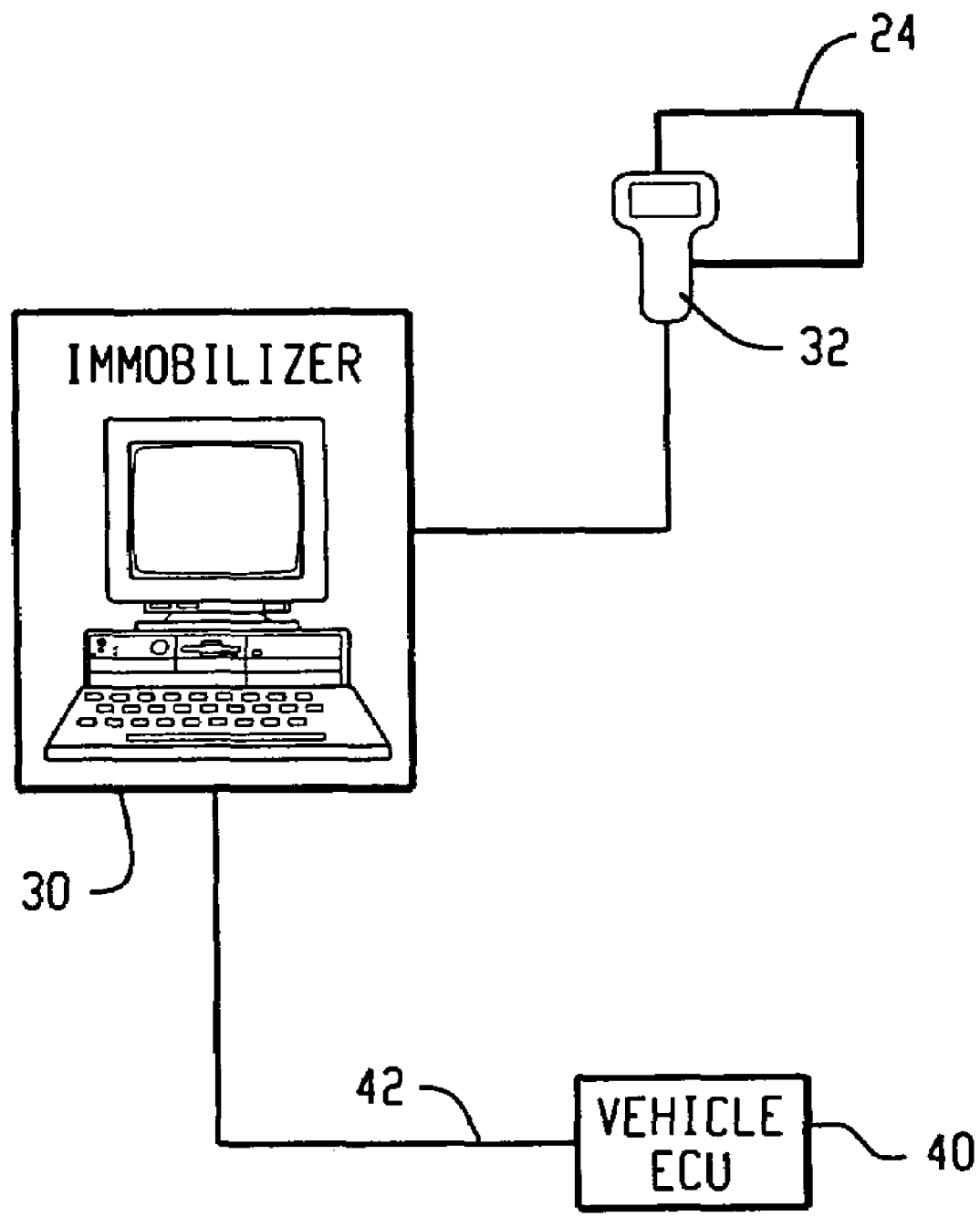

The vehicle Immobilizer 30 also includes a scanner 32, so as to enable the Immobilizer 30 to read the data sheet 24 and operate in a "standalone" mode (as shown in FIG. 1D) in the event that the network connection is lost to the ALC client 20. In addition to the steps of writing the VIN and the information record to the ECU 40, the computer-implemented writing operation of the Immobilizer 30 also registers one or more vehicle keys to the electronic control unit 40, so as ensure that the vehicle ignition will not operate unless a properly activated key is used.

The above-described system is operable to regulate and coordinate data communication between the ALC servers 26, the ALC client 20, the vehicle Immobilizer 30 and, ultimately, the vehicle ECU 40. In the following section, the system and, more significantly, the method of using the system 10 are disclosed to insure accurate and complete information transfer.

The data preferably travels through an RS232C interface 74 from the Immobilizer 30 to the ALC client 20. In the preferred embodiment, the interface 74 operates at FULL DUPLEX, meaning that data can be sent and received at the same time, i.e. that data can be simultaneously exchanged between the ALC client 20 and the Immobilizer 30. In the preferred embodiment, the ALC client 20 operates over a TCP/IP network and the Immobilizer 30 uses the RS232C protocol. The terminal server 76 is used as the protocol converter and the network interface to link the Immobilizer 30 to the ALC client 20. However, the ALC client 20 might run on a PC with the Immobilizer 30 hooked up to the PC's corn port. Therefore the terminal server 76 would not be needed. It should be noted that the illustrated configuration is exemplary and can be replaced by any other suitable configurations without departing from the invention.

Figure 2A:
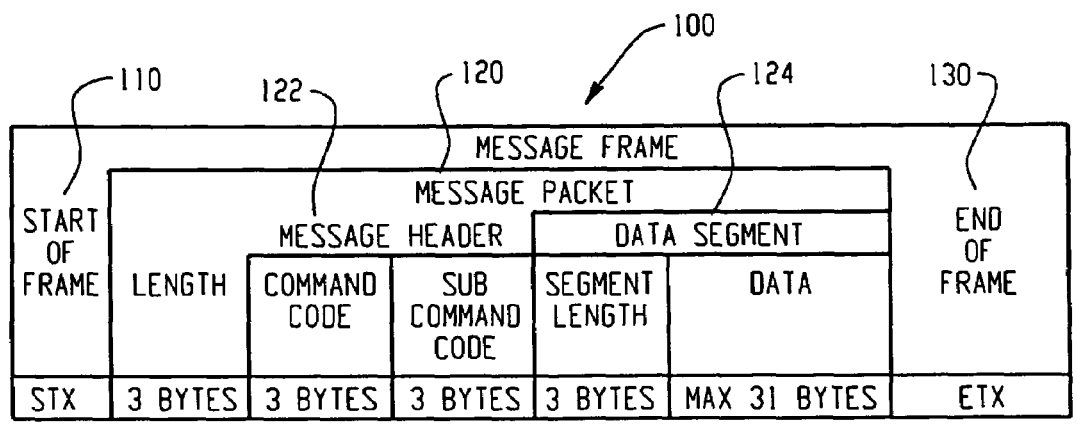
FIGS. 2A, 2B, 2C, 2D, 2E, 2F, 2G, 2H, 2I, 2J and 2K depict the data structure of various commands used in communicating between the software application and the Immobilizer in accordance with the preferred embodiment.

In the preferred embodiment, all information sent over the communication links is ASCII format. As shown in FIG. 2A, a command 100 preferably consists of three portions—a start of frame portion 110, a message packet portion 120, and an end of frame portion 130. The message packet portion 120 consists of two parts—a message header 122 and a data segment 124. The start of frame portion 110 contains one byte, ASCII character STX (0x02). The end of frame portion 130 contains one byte, ASCII character ETX (0x03). The message header 122 contains 9 bytes, and the parts of the message header 122 are shown in TABLE 1.

TABLE I

| Part | Bytes | Comment |
| --- | --- | --- |
| Length | 3 | The message header always contains the length of the Message Packet. The length is three ASCII digits long ('0' (0 x 30)... '9' (0 x 39)). In this application it specifies a range of 009 to 043. |
| Command Code | 3 | The command code is three-byte long and is specified by three ASCII digits ('0' (0 x 30)... '9' (0 x 39)). The command code describes the type of the sent command. |
| Sub Command Code | 3 | The sub command code is three-byte long and is specified by three ASCII digits ('0' (0 x 30)... '9' (0 x 39)). The sub command code is used by an acknowledgement command, representing the original |

TABLE I-continued

| Part | Bytes | Comment |
|---|---|---|
| | | command code to which this acknowledgement is for. If the command is an original command, its sub command code will be set to 000. |

It should be noted that the length portion and the two codes are padded on the left with the ASCII character '0' (0x30).

The content of the data segment depends on the specific command issued within the components. Some commands do not have a data segment, as will be seen below. As shown in TABLE 2, the data segment contains two parts, the segment length and the data.

TABLE 2

| Part | Bytes | Comment |
|---|---|---|
| Segment Length | 3 | The segment length contains the length of the Data Segment. The length is three ASCII digits long ('0' (0 × 30)... '9' (0 × 39)). |
| Data | Max 31 | ASCII data representing specific contents of information. For each command, the size of the data field is fixed to accommodate the longest data possible. If the length of a specific data is shorter than the fixed size, the data is padded on the right with space (0 × 20). |

2E, 2F, 2G, 2H, 2I, 2J and 2K during an exemplary data communication process. An explanation of codes is as follows:

VIN refers to vehicle identification number;

MTOC refers to model/type/options/color, the type of information preferably included in information record associated with the VIN maintained in the database 52;

MTO refers to the MTOC, minus the color (since color is preferably not included in the registration);

REG indicates that the VIN and MTO are registered to the ECU 40 by the Immobilizer 30;

DONE indicates that an operational cycle is completed;

ACK is an acknowledgement of a previous command and/or data contents;

OK indicates that a command and/or data contents are valid;

NG indicates that a command and/or contents are not valid;

ABORT indicates that the operational cycle should be aborted;

ERR indicates that an error occurred in receiving or processing a command.

TABLE 3

| Command Type | Command Name | Command Code (In Message Header) | Sub Command Code (In Message Header) | Data | Sender | Receiver |
|---|---|---|---|---|---|---|
| VIN | VIN | 001 | 000 | Long VIN contents | ALC Client | Immobilizer |
| MTOC | MTOC | 002 | 000 | MTOC contents | ALC Client | Immobilizer |
| REG DONE | REG DONE | 003 | 000 | Long VIN, MTO contents | Immobilizer | ALC Client |
| ACK | ACK(VIN) | 004 | 001 | Long VIN contents | Immobilizer | ALC Client |
| | ACK(MTOC) | | 002 | MTOC contents | | |
| OK | OK(MTOC) | 005 | 002 | None | ALC Client | Immobilizer |
| | OK(REG) | | 003 | None | | |
| NG | NG(VIN) | 006 | 001 | Bad VIN | ALC Client | Immobilizer |
| | NG(MTOC) | | 002 | Bad MTOC | | |
| | NG(REG) | | 003 | Bad REG BOTH | | |
| | NG(REG) | | 003 | Bad REG VIN | | |
| | NG(REG) | | 003 | Bad REG MTO | | |
| ABORT | ABORT | 007 | 000 | None | Immobilizer | ALC Client |
| ERR | ERR | 008 | 000 | None | Immobilizer | ALC Client |

Figure 2B:
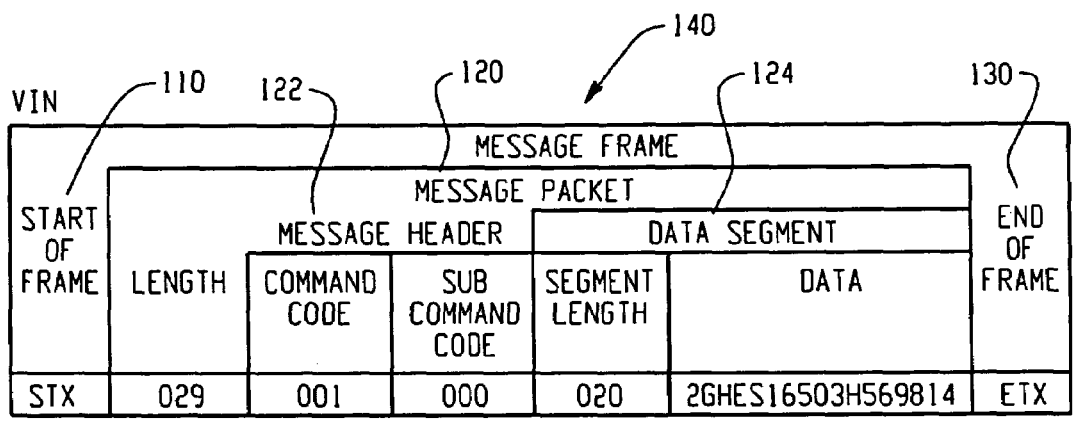
Figure 2C:
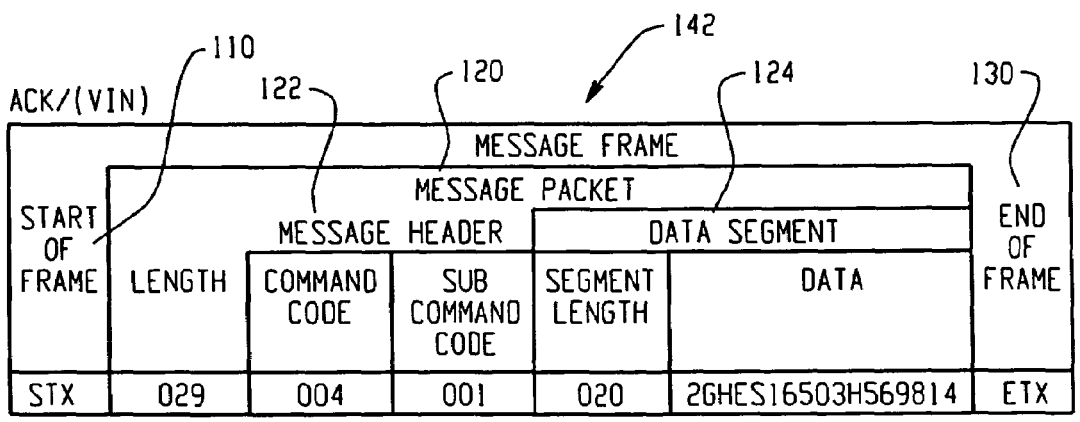
Figure 2D:
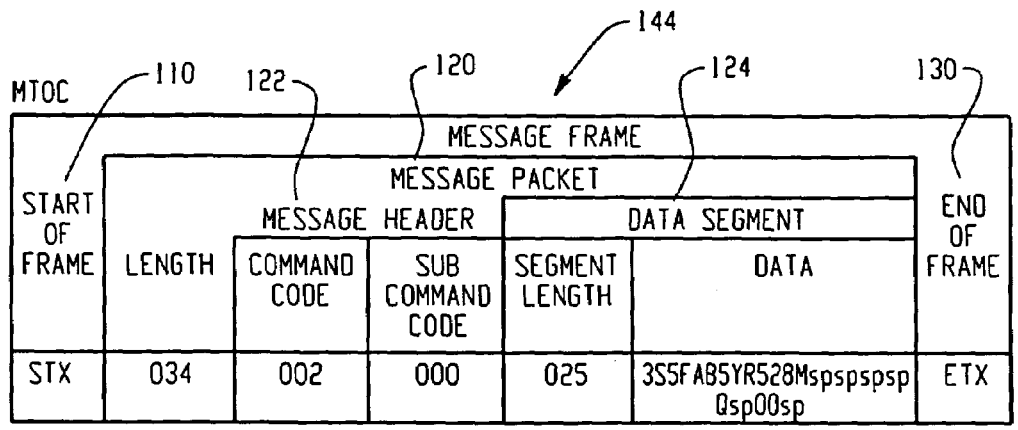
Figure 2E:
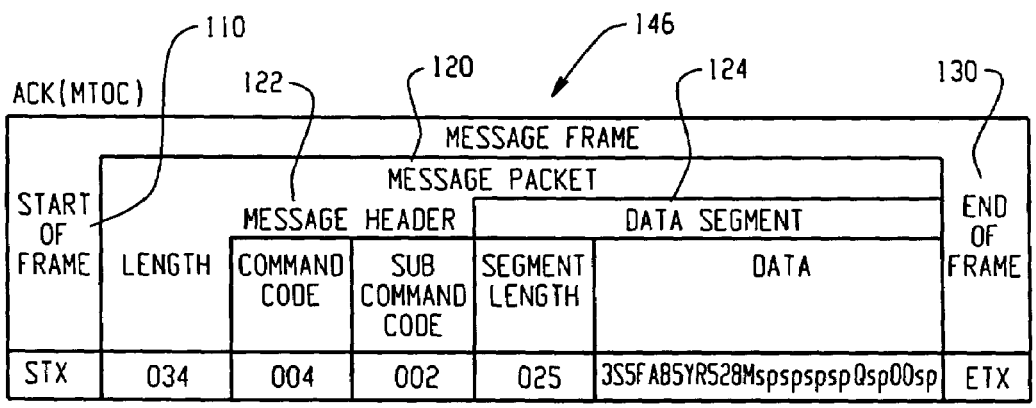
Figure 2F:
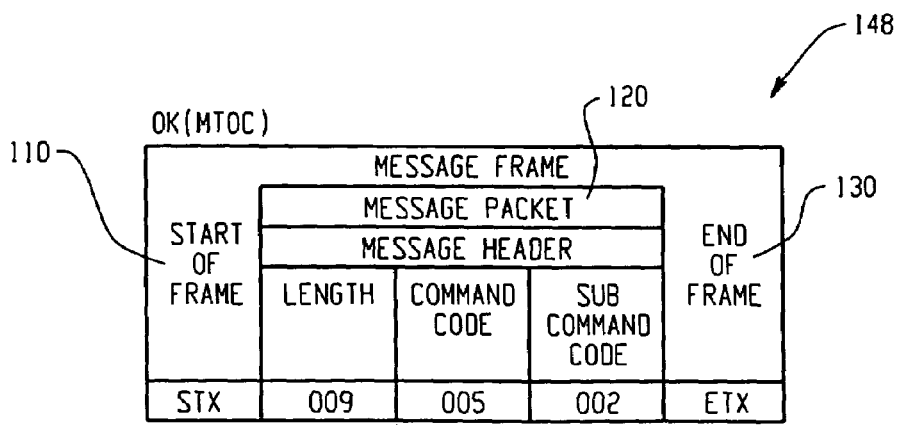
Figure 2G:
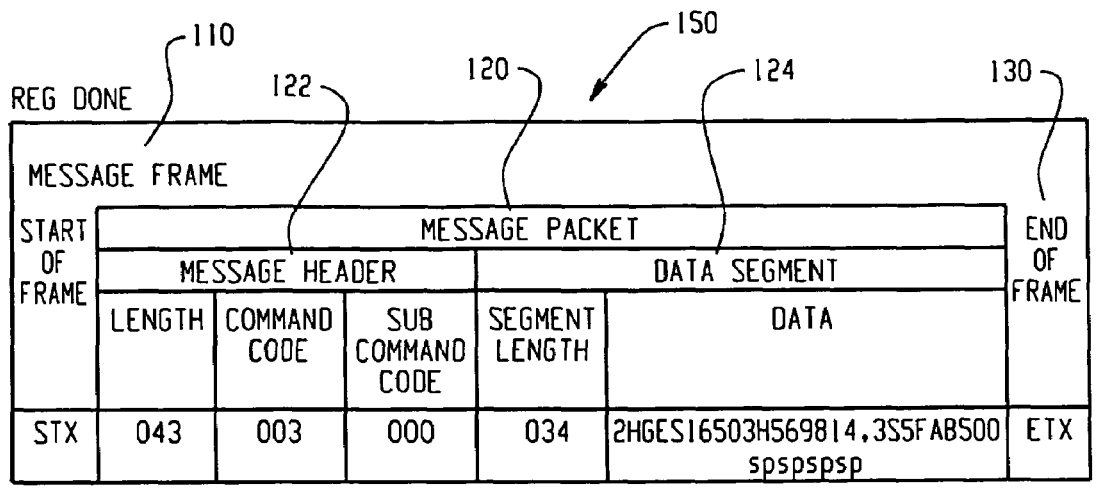
Figure 2H:
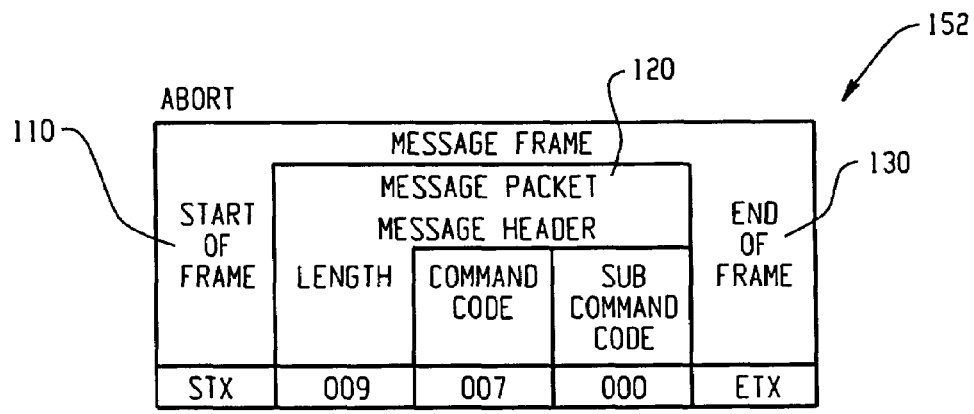
Figure 2I:
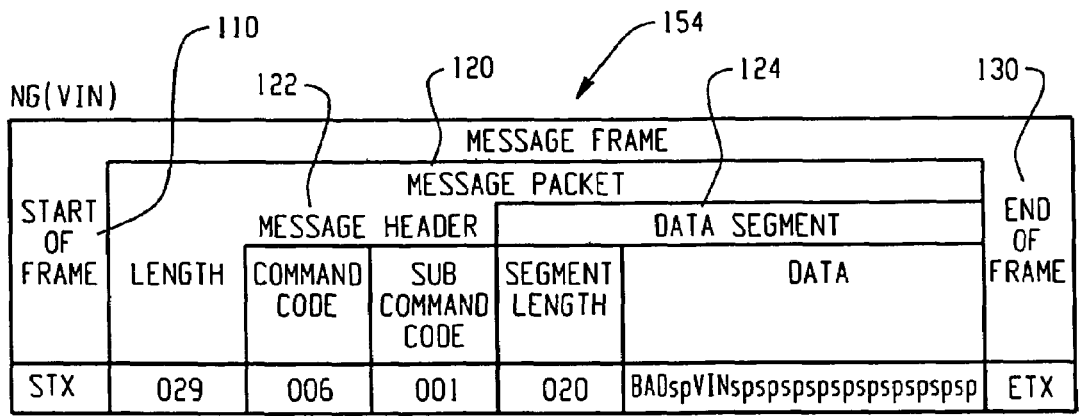
Figures 2J, 2K:
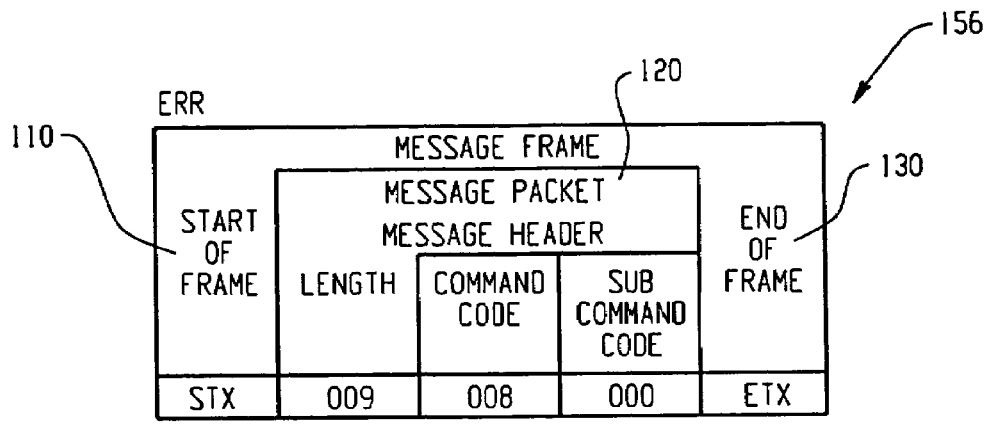
Figure 3A:
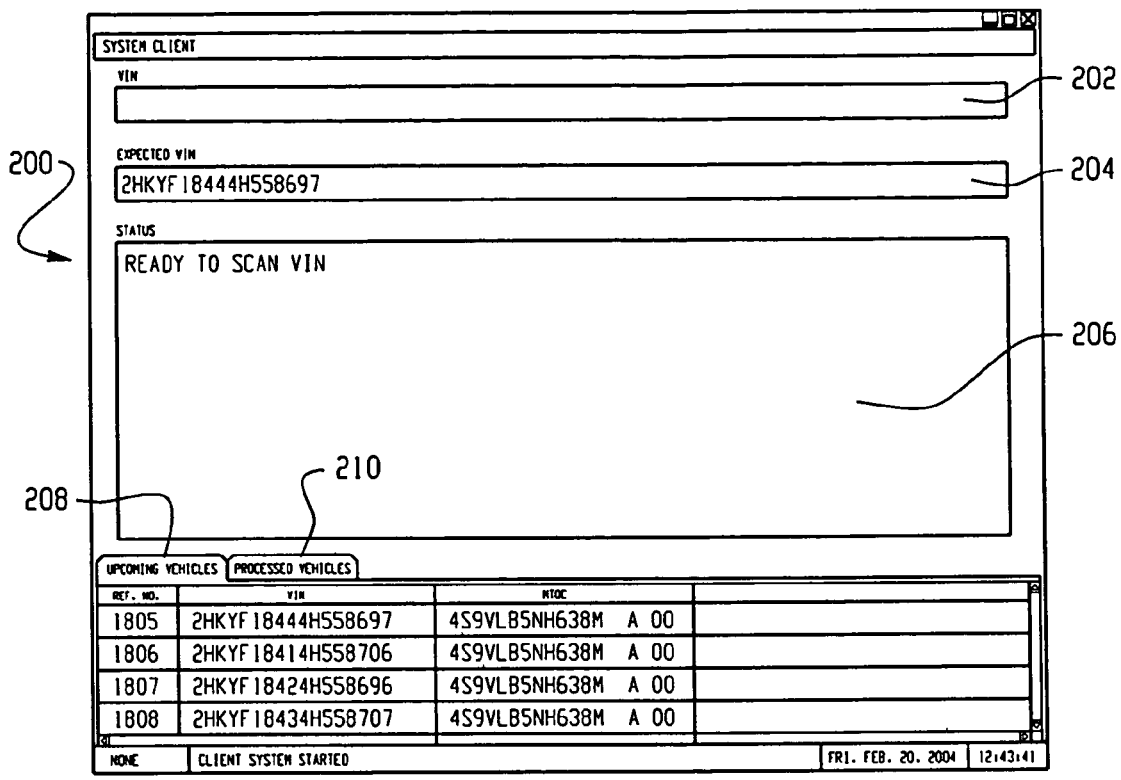
Figure 3B:
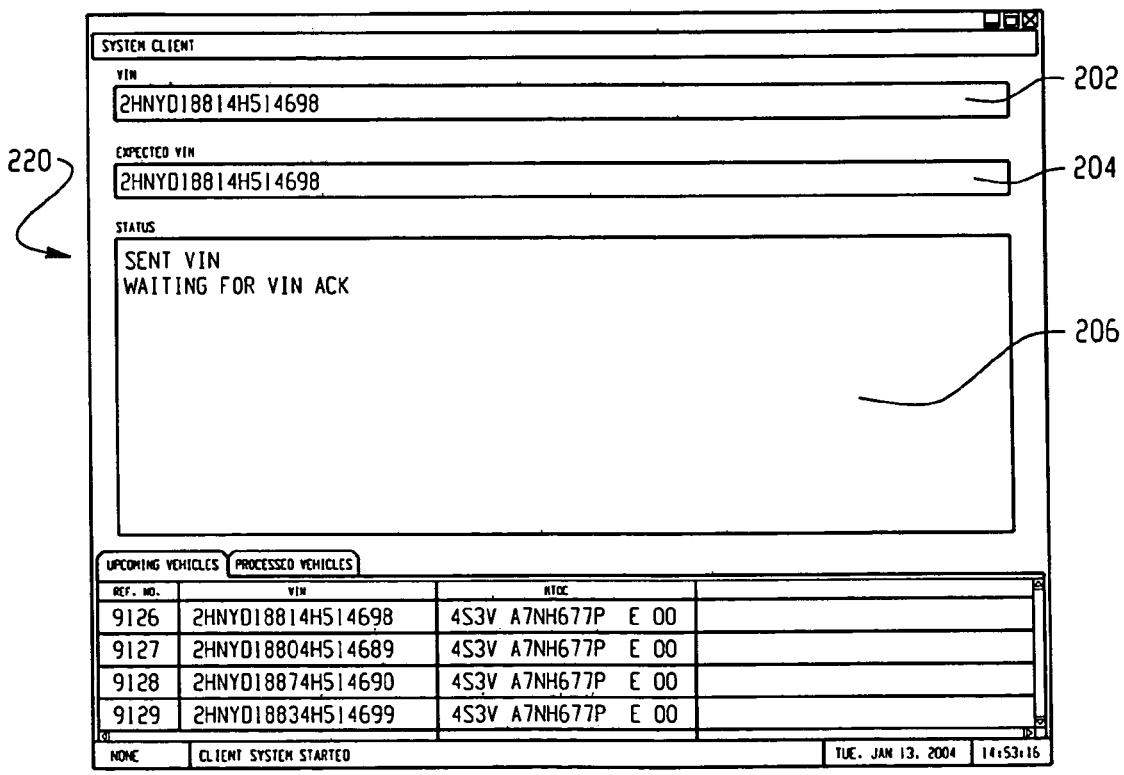
Figure 3P:
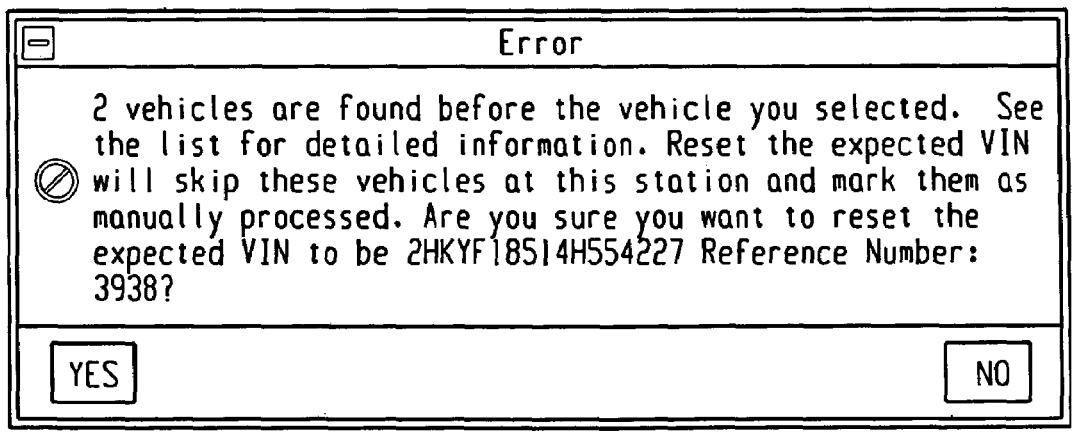
Figure 4:
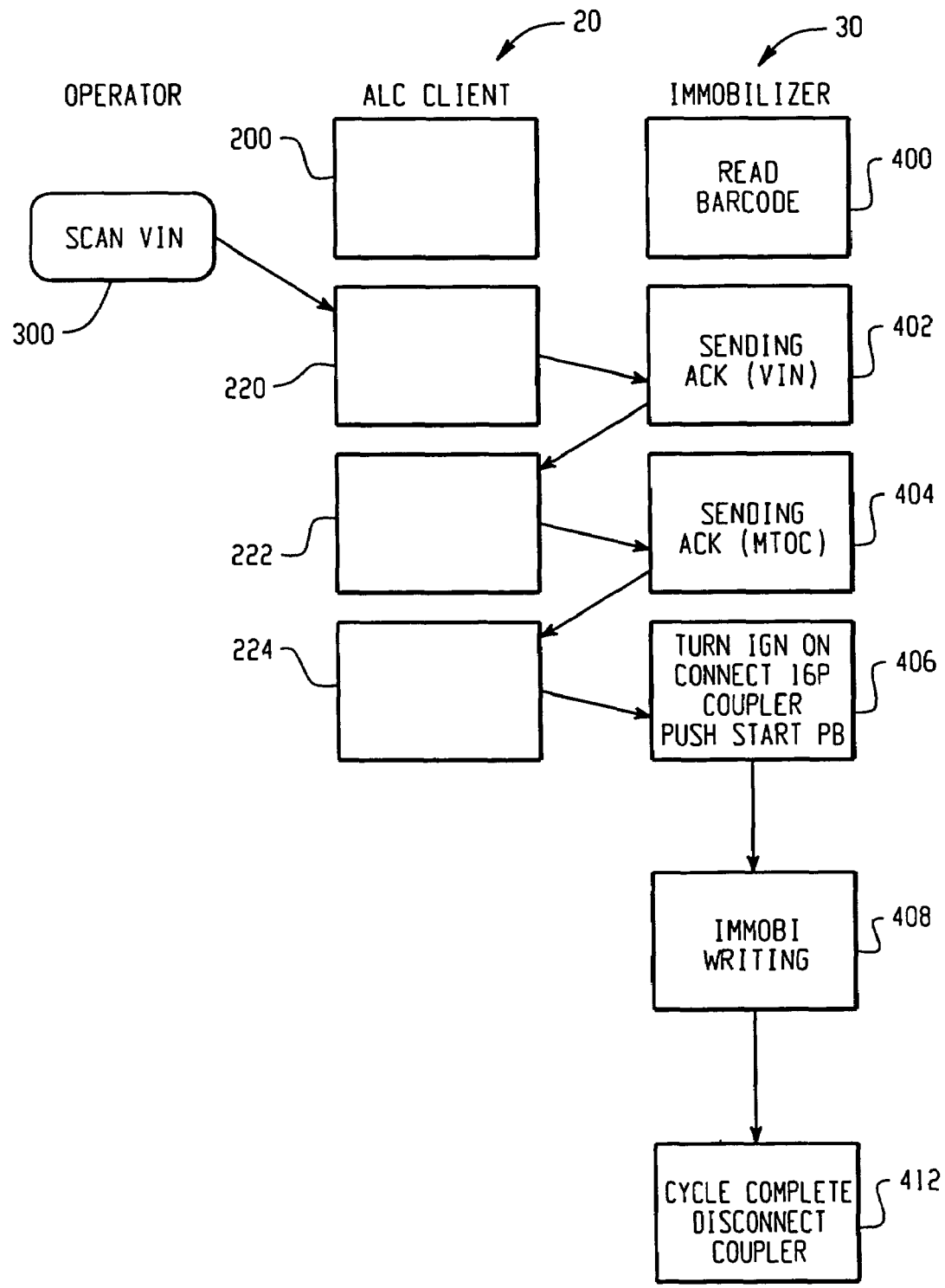
FIG. 4 depicts the operational flow of the method including the display screens as shown on the software application and the Immobilizer station, in accordance with the preferred embodiment.

TABLE 3 shows a list of commands exchanged between the ALC client 20 and the Immobilizer 30. These commands are respectively illustrated as indicated in FIGS. 2B, 2C, 2D, FIGS. 3A-3P and 4 illustrate the operational flow of the method in accordance with the preferred embodiment. More specifically, FIGS. 3A-3P illustrate a number of display windows of the GUI display 60 of the ALC client 20 that collects the vehicle's VIN and MTO data during the operational flow of the present method. FIG. 4 shows the operational flow of the present method, along with the display windows of the ALC client 20 as compared with the display screens shown by the vehicle Immobilizer 30. Processing of information and vehicles according to the present invention will be described hereinafter with reference to FIGS. 3A-3P, 4 and 5A-5E and the messages of FIGS. 2A-2J.

FIG. 3A shows a Ready State screen 200, i.e. when the ALC client 20 is awaiting a VIN entry (i.e., a VIN input to the ALC client by scanning the data sheet 24 with the scanner 22). The Ready State screen 200 is displayed in a window having a standard window format with fields that correspond to similar fields in other windows, described hereinafter. A VIN entry field 202 is shown for indicating the current scanned or manually entered VIN. An Expected VIN field 204 displays the current VIN expected to be scanned into the client 20. The Status window 206 displays the state of the process at each stage prior, during and after VIN registration. The Upcoming Vehicles tab 208 displays a list of expected VINs and associated MTOC information records for upcoming vehicles in the production line. The ALC client 20 asks the ALC servers 26 to populate this list periodically to be used by the current process point. The VIN data shown in the Expected VIN field 204 should match the top VIN entry shown in the Upcoming Vehicles list 208. The Processed Vehicles tab 210 displays a list of VINs and MTOC information records for vehicles already processed at the current process point. In the preferred embodiment, the ALC database 52 keeps track of the progress of vehicles going down the assembly line. The MTOC data is determined ahead of time for a particular production schedule. This information is pre-populated into a table in the database 52. Preferably, a batch of expected VINs and associated MTOC information is sent in advance to the ALC client 20, so that registration can be performed in the event that the network connection is interrupted to the ALC servers 26 and ALC client 20, as will be explained hereinbelow.

Figure 5A:
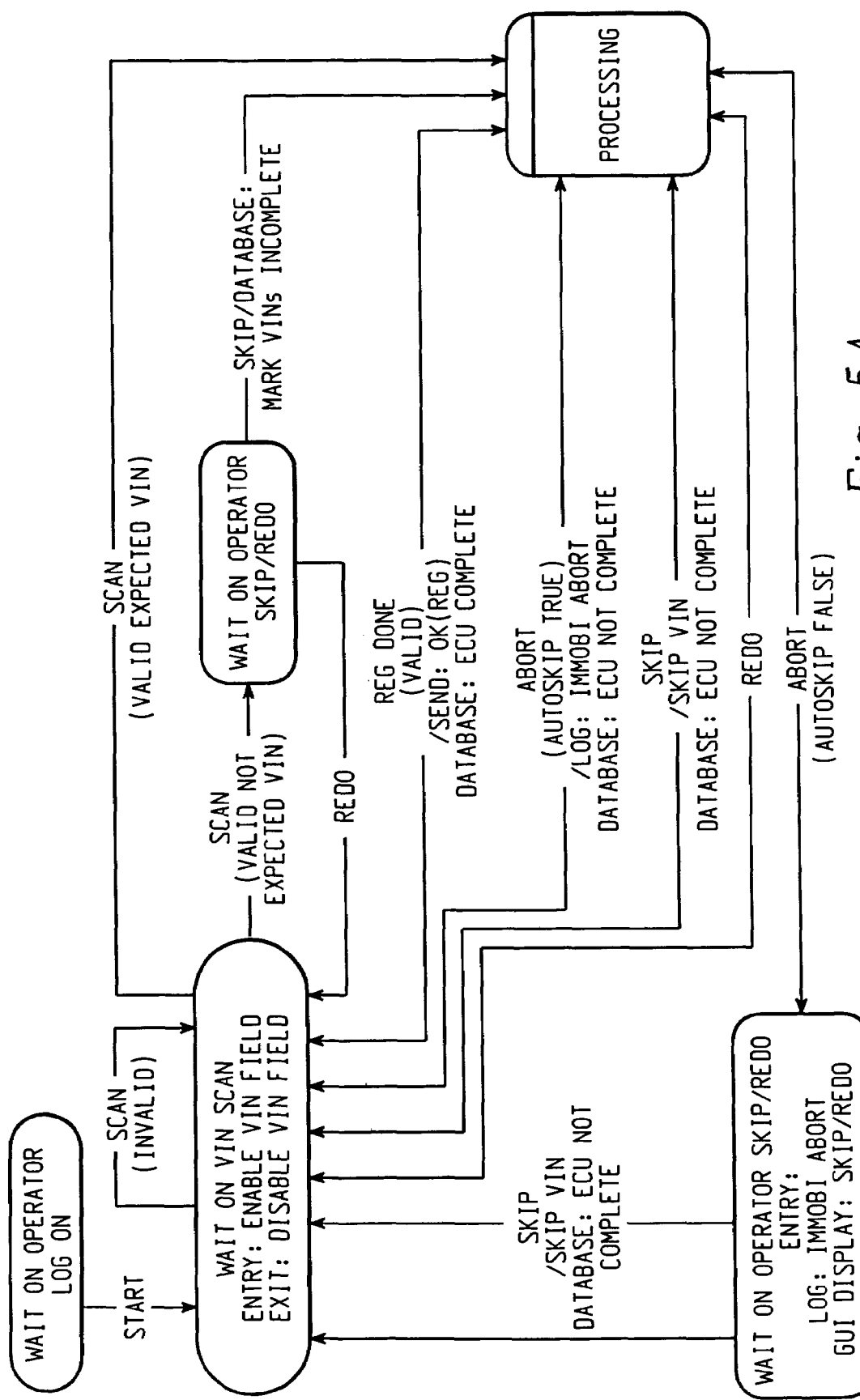
FIGS. 5A, 5B, 5C, 5D and 5E are flow charts illustrating the steps of the method on accordance with the preferred embodiment.

In the beginning of a VIN registration process, the ALC client 20 is in the Wait on VIN Scan state indicated in FIG. 5A and displays the Ready State screen 200 of FIG. 3A. The Status field 206 displays Ready to Scan VIN. This message lets a production associate know that the ALC client 20 is ready to accept a scanned or manually entered VIN. The Immobilizer displays a Read Barcode screen 400 indicating that the Immobilizer 30 is awaiting VIN data from the ALC client 20.

Figure 5B:
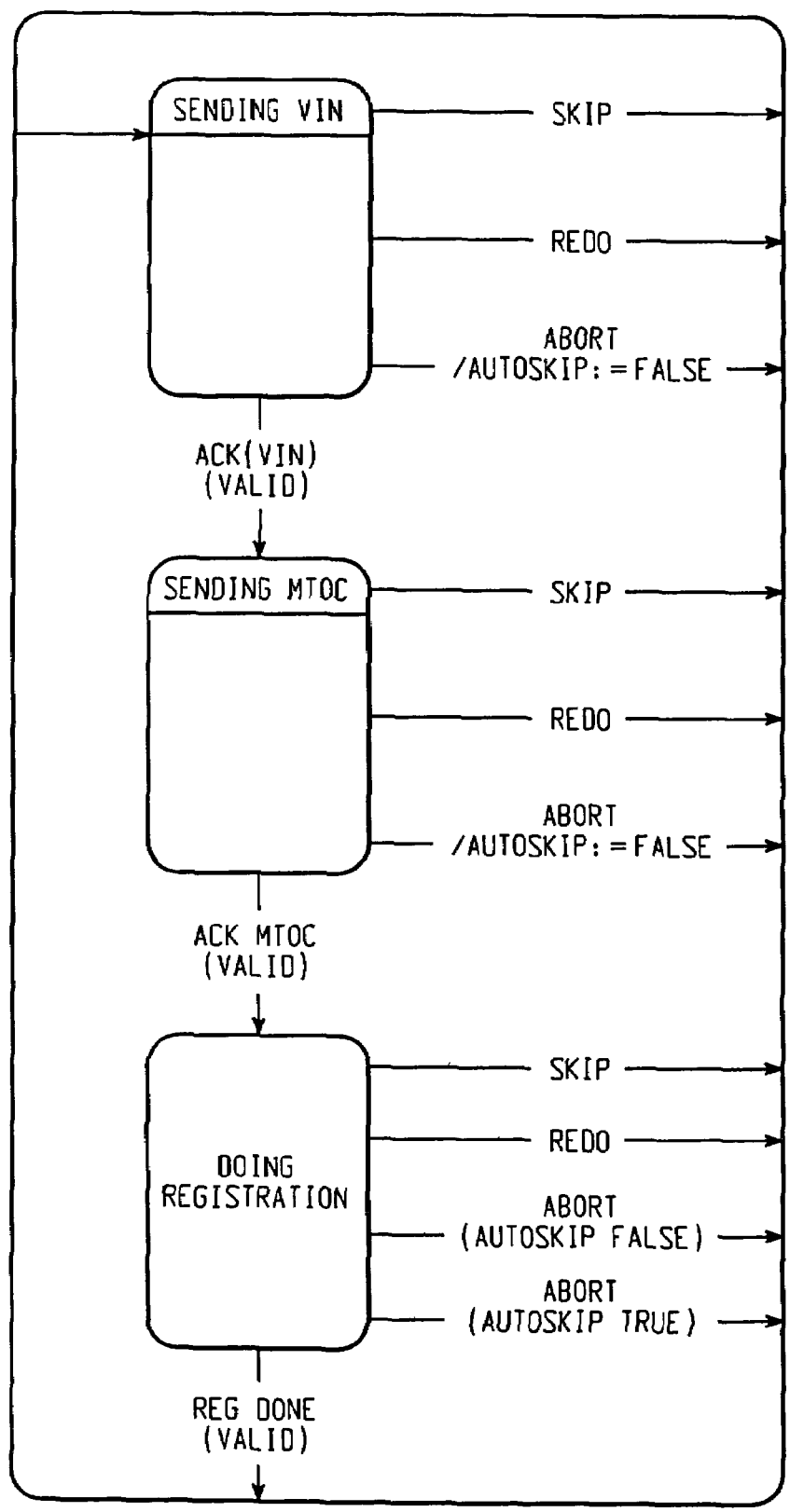
Figure 5C:
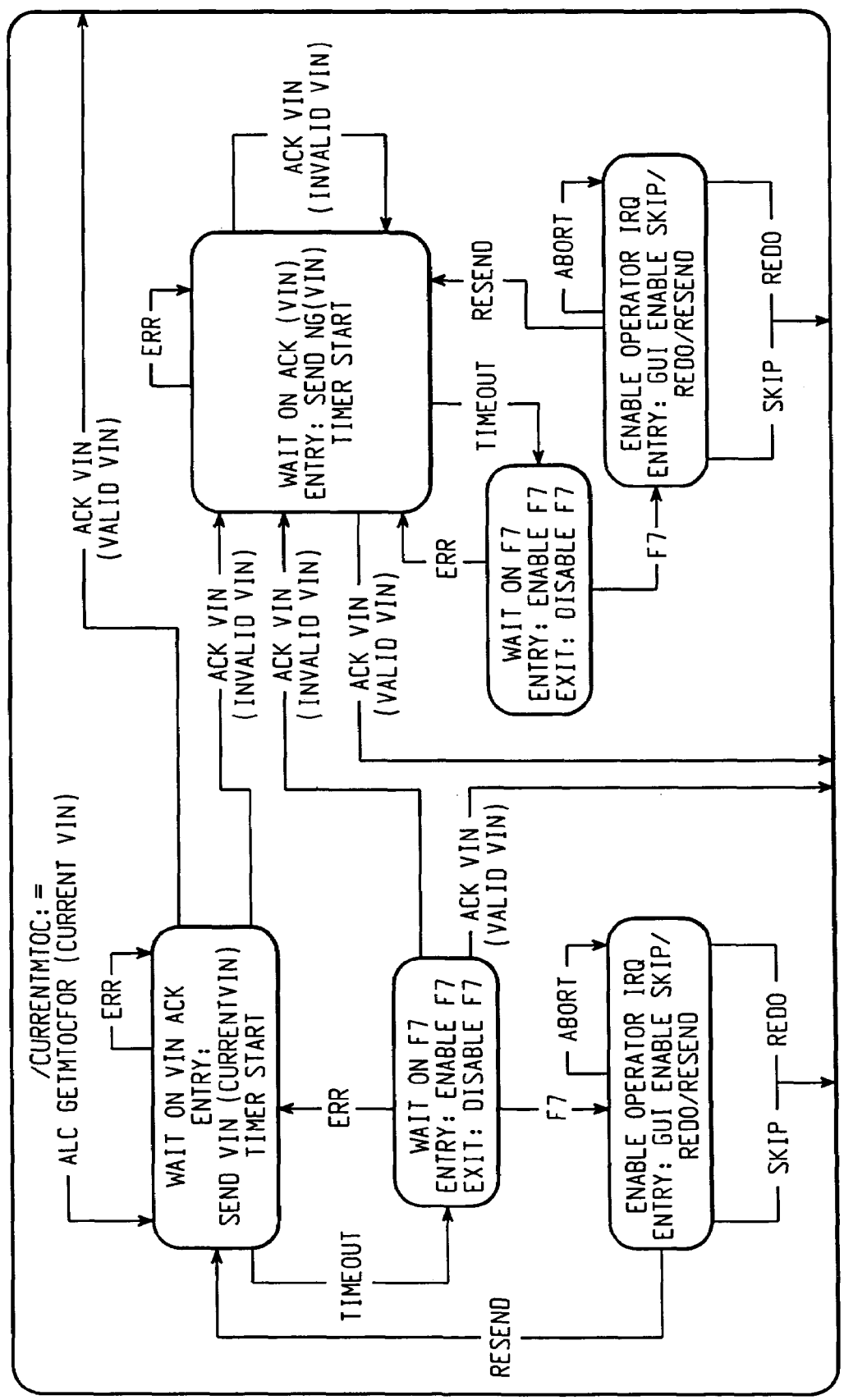

As shown in FIG. 4, a scanning step 300 is performed of scanning a VIN bar code from a body assembly sheet 24. As shown in FIG. 5A, if the scan results in a valid expected VIN, the scanned VIN is sent for processing and a Sent VIN screen 220 is displayed on the ALC client screen, as shown in FIG. 3B. The scanned VIN appears in the VIN entry field 202 as shown in FIG. 3B. The ALC client 20 compares the scanned VIN with the expected VIN and, if the scanned VIN matches the expected VIN shown in field 204, the background color of fields 202, 204 and 206 will become green and a Sending VIN command 140 as shown in FIGS. 2B and 5B will be sent to the Immobilizer for acknowledgement. The Status field 206 of the Sent VIN screen 220 (FIG. 3B) will display Sent VIN, and Waiting for VIN ACK messages. The process is in a Wait on VIN ACK as indicated in FIG. 5C. If the Immobilizer 30 receives the VIN command 140 from the ALC client 20, the Immobilizer 30 will send back to the ALC client 20 a VIN acknowledgement command 142, such as shown in FIGS. 2C, 5B and 5C, and will display a Sending ACK (VIN) screen 402, as shown in FIG. 4.

Figure 3C:
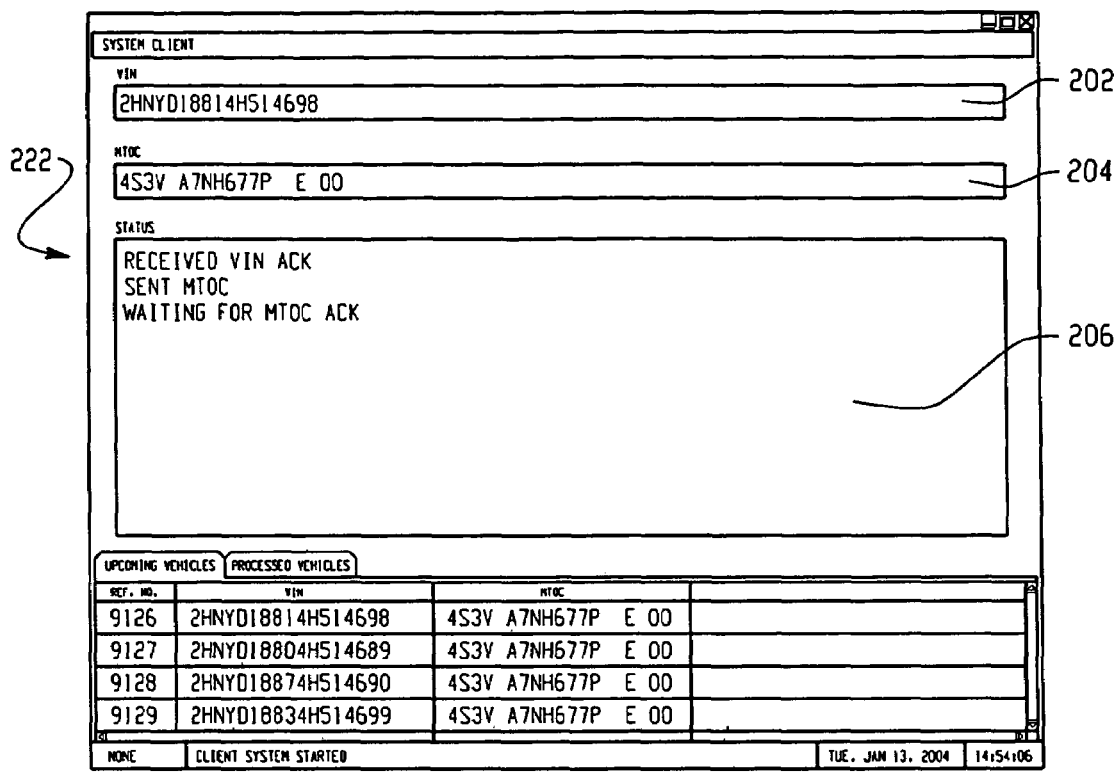
Figure 5D:
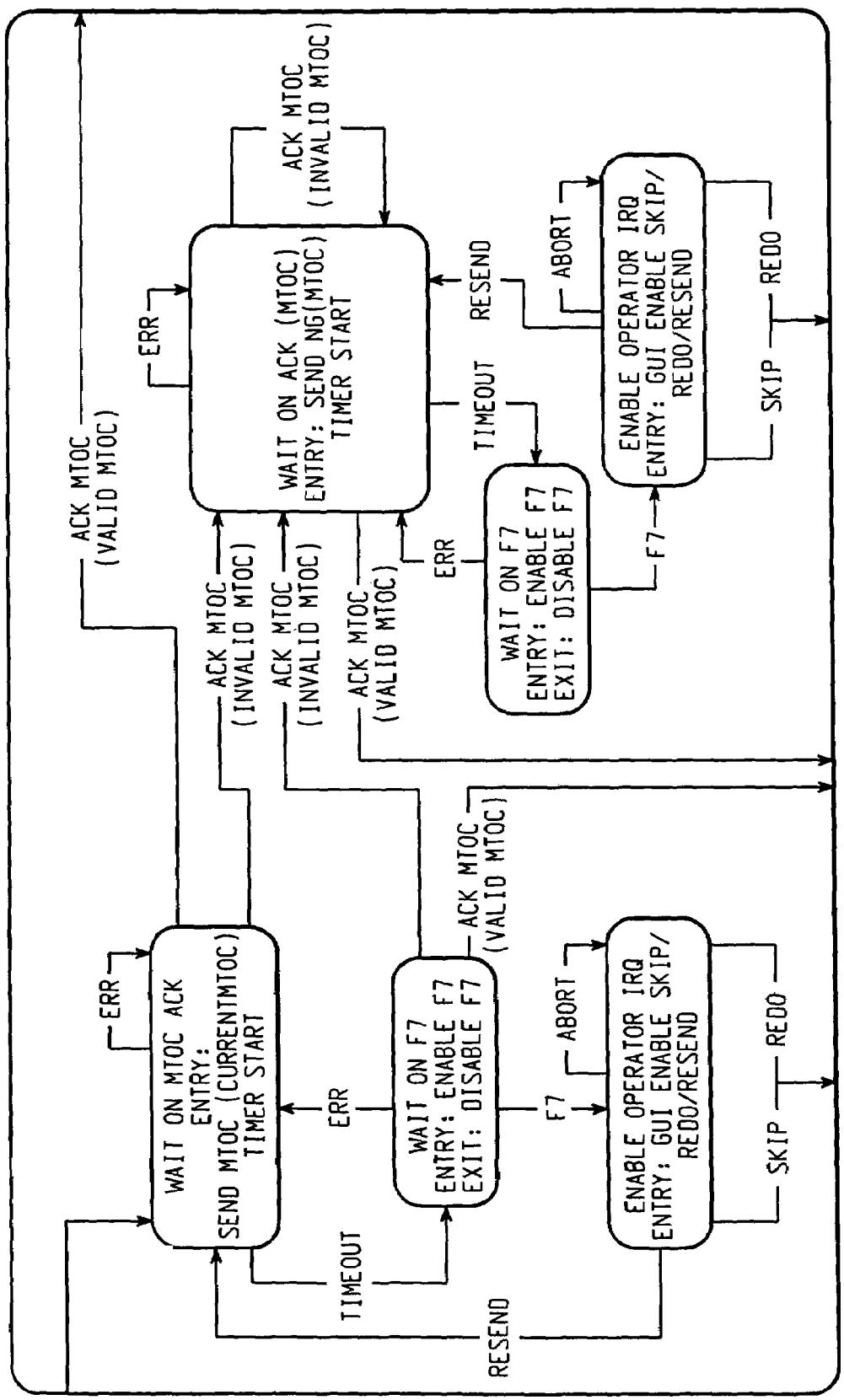

Upon receiving a valid VIN acknowledgement command 142 from the Immobilizer station as indicated in FIG. 5B, the ALC client 20 will display a Received VIN ACK screen 222 as shown in FIG. 3C. As shown in FIG. 5B, the ALC client 20 will send the associated MTOC information record (FIG. 5B) to the Immobilizer station in the form of an MTOC command 144, shown in FIG. 2D. The label above the Expected VIN field 204 will be changed to read MTOC and the field content will now display the value of the associated MTOC. The ALC client 20 is in a Wait on MTOC ACK state, as shown in FIG. 5D. The Status field 206 will show Received VIN ACK, Sent MTOC, and Waiting for MTOC ACK status messages. If the Immobilizer 30 receives the MTOC command 144 from the ALC client 20, the Immobilizer 30 will send back to the ALC client 20 a MTOC acknowledgement command 146, such as shown in FIG. 2E, and will display a Sending ACK (MTOC) screen 404, as shown in FIG. 4.

Figure 3D:
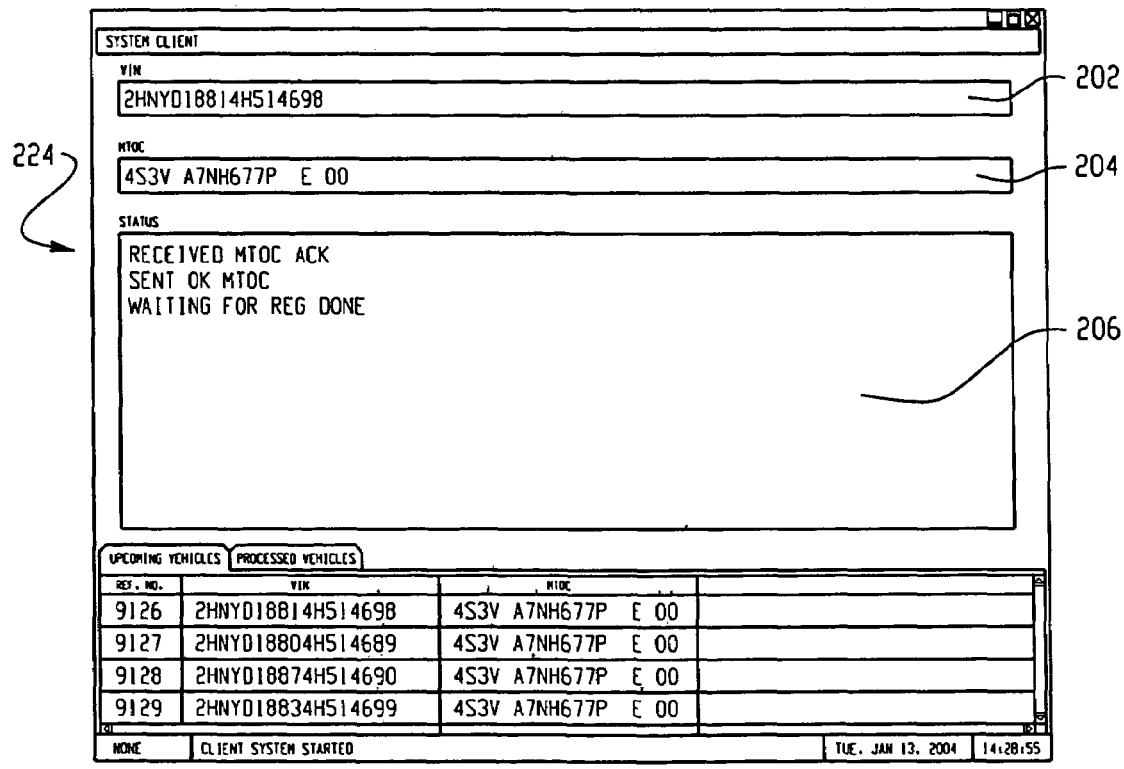
Figure 5E:
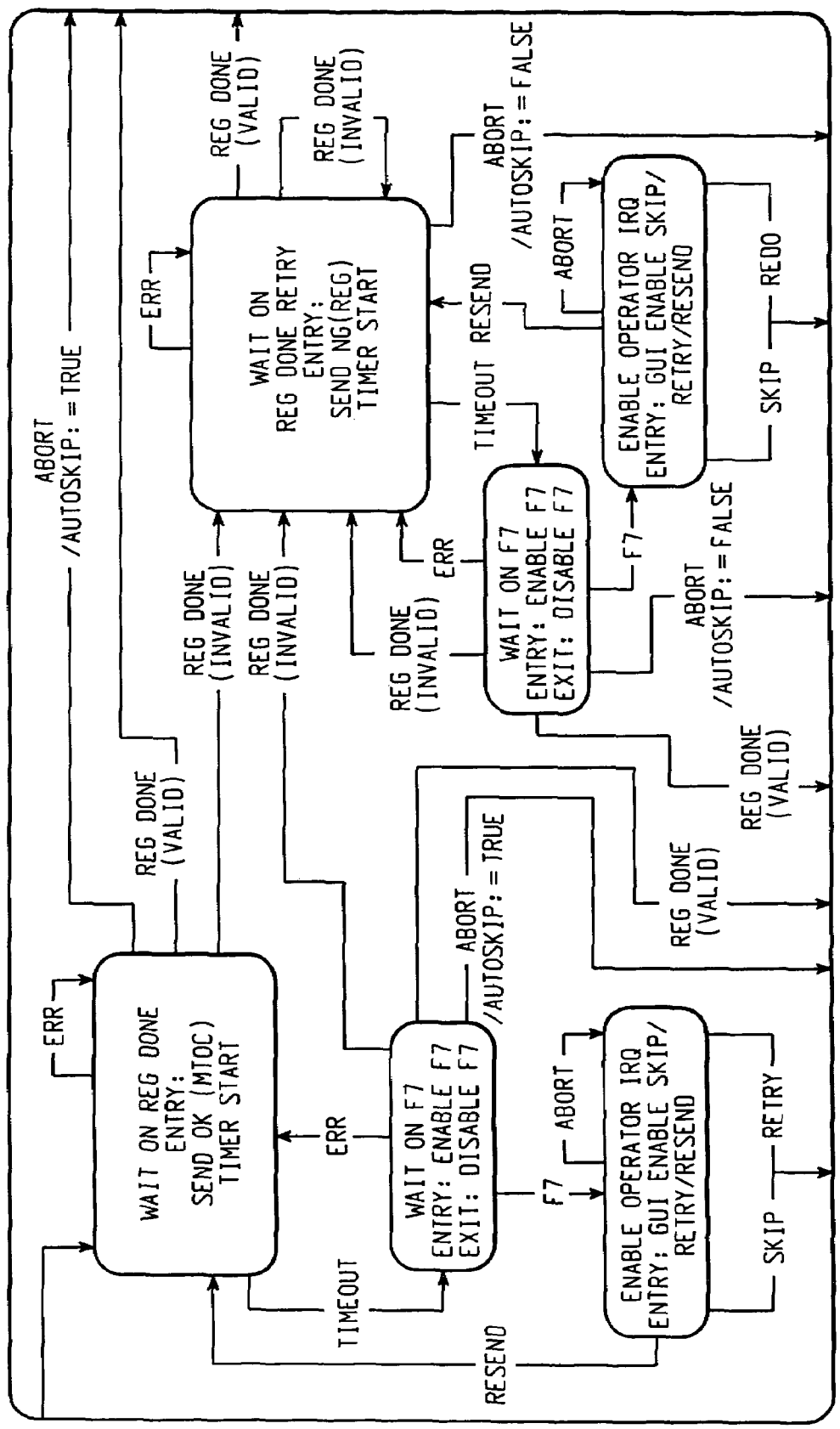

Upon receiving a valid MTOC acknowledgement 146 from the Immobilizer 30, the ALC client 20 will display a Received MTOC ACK screen 224 as shown in FIG. 3D. The ALC client 20 will send to the Immobilizer 30 an OK MTOC command 148 as shown in FIG. 2F. The ALC client 20 is in a Wait on REG DONE state, as indicated in FIG. 5E. The Status field 206 will display Received MTOC ACK, Sent OK MTOC, and Waiting for REG DONE messages as shown in FIG. 3D. When the Immobilizer 30 receives the OK MTOC command 148, it displays a screen 406 instructing the associate to Turn IGN ON, Connect 16P Coupler, and Push Start PB. At this prompt, as shown in FIG. 4, the associate performs the steps of connecting the coupler 302, by extending a cable from the Immobilizer 30 and plugging it in to an ECU interface (not shown) in the vehicle cabin.

With the key in the on position, a step of pushing the "start" pushbutton 306 on the Immobilizer 30 is performed, at which point the Immobilizer 30 writes the VIN and only the MTO information to the vehicle's ECU 40. In the preferred embodiment, although MTOC information is available, only the MTO information is registered in the vehicle ECU 40. Naturally, it is contemplated that the MTOC information, as well as other information, may be registered with the ECU 40. The Immobilizer 30 displays an Immobi Writing screen 408 while the Immobilizer 30 writes data into the vehicle's ECU. After all the writing is complete, the vehicle Immobilizer reads from the vehicle's ECU the vehicle identifier and the information record, and sends them back to the ALC client 20 with a REG DONE command 150 (FIGS. 2G, 5A and 5E). If the two pieces of information read from the ECU match the two pieces of information held by the ALC client 20 (i.e. if REG DONE is valid), the ALC client 20 sends an OK REG message (FIG. 2K) to the Immobilizer. The ALC client 20 then notifies ALC servers 26 to record the VIN registration record in the central database 52. The ALC client 20 also updates the Upcoming Vehicles and Processed Vehicles VIN Lists and also restores its window to the Ready State screen 200. As indicated in FIG. 5A, the ALC client 20 returns to the Wait on VIN Scan state.

Upon receiving the OK REG message, the Immobilizer 30 displays a screen 412 stating, Cycle Complete, Disconnect Coupler. The associate then performs steps of turning off the key and disconnecting the coupler. The Immobilizer 30 resumes to its ready state and the ECU data registration process is complete. A complete VIN registration record including the VIN and the associated information, MTO, is maintained in the ALC database 52 on the network. This information can be retrieved at a later time by the vehicle dealer, owner or service personnel if such information is ever required throughout the service life of the vehicle.

The foregoing describes the system's method of operation during normal (i.e. error-free) processing of information. Other methods are available for process recovery in the event that a problem is encountered with VIN and MTO registration, e.g. if there is an interruption in power or signal, or if data is corrupted, etc., at any stage in the process during operation.

For example, an abort operation can be performed whereby, if an immobilization operation is unsuccessful, an associate can abort the process by pushing a Complete push button 34a on the Immobilizer station 30. This will trigger an abort command 152 as shown in FIG. 2H to be sent to the ALC client 20. The abort signal is handled differently depending on the current operational state of the ALC client 20.

Figure 3E:
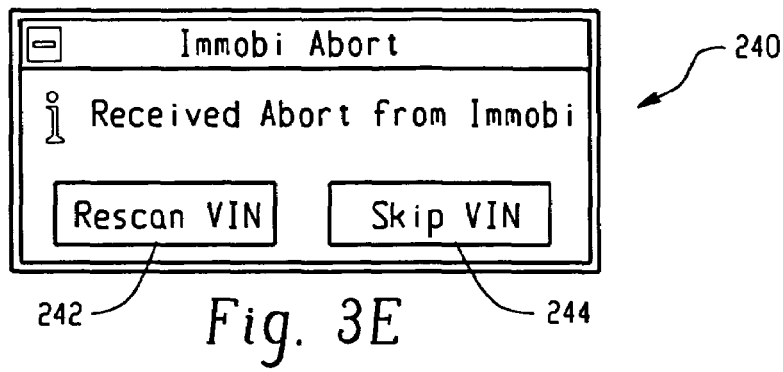

For example, if the ALC client 20 is in its Ready State, the abort command 152 from the Immobilizer 30 is ignored. This means the ALC client 20 will do nothing except continue to wait for VIN input. On the other hand, if the ALC client 20 receives an abort command 152 during VIN or MTOC transmission state (FIG. 5A, 5B), a dialog prompter screen 240, as shown in FIG. 3E, will pop up. The dialog prompter screen 240 gives the associate the choice of either rescanning the current VIN or skipping the current VIN. The ALC client 20 is in a Wait on Operator Skip/Redo state, as indicated in FIG. 5A. The Rescan VIN button 242 allows the ALC client 20 to go back to Ready State with the same expected VIN, in order to redo the scan (FIG. 5A). The Skip VIN button 244 allows the ALC client 20 to skip the current expected VIN and return to the Ready State to wait for the next expected VIN (FIG. 5A). This skipped VIN will be marked as incomplete with an indication of an Immobilizer Abort in the ALC database 52.

Further, if the ALC client 20 receives the abort command 152 while waiting for the first REG DONE command 150 from the Immobilizer 30 (FIGS. 5A, 5B), the ALC client 20 will automatically skip the current VIN and go back to the Ready State to wait for the next expected VIN. The skipped VIN will be marked as incomplete with an Immobilizer Abort indicated in the ALC database. No dialog option prompter will show up in this case.

Figure 3F:
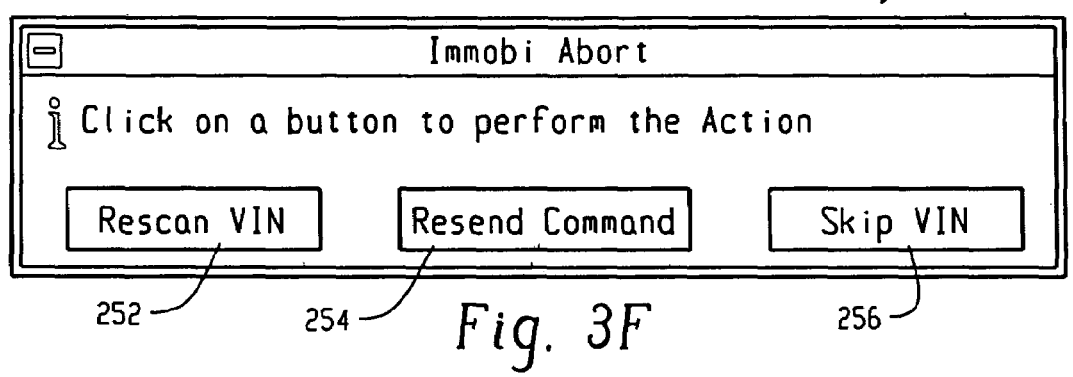

The present method also includes a Timeout Operation in the event that the ALC client 20 does not receive any suitable signal from the Immobilizer 30 after a suitable interval. The ALC client 20 times out (goes into a waiting state) and enables the F7 function key to recover the ALC client 20 from a waiting state. During VIN or MTOC message transmission (FIGS. 5C and 5D) the default timeout value is 5 seconds. During REG DONE transmission (FIG. 5E), the default timeout value is 15 seconds. This means that F7 will be enabled if the default timeout value time has passed without the ALC client 20 receiving a signal from the Immobilizer station 30. When F7 is invoked during VIN scanning (FIGS. 5A, 5C), the ALC client 20 is in an Enable Operator IRQ state, and a three-option dialog prompter screen 250 will appear, as shown in FIG. 3F.

Figure 3G:
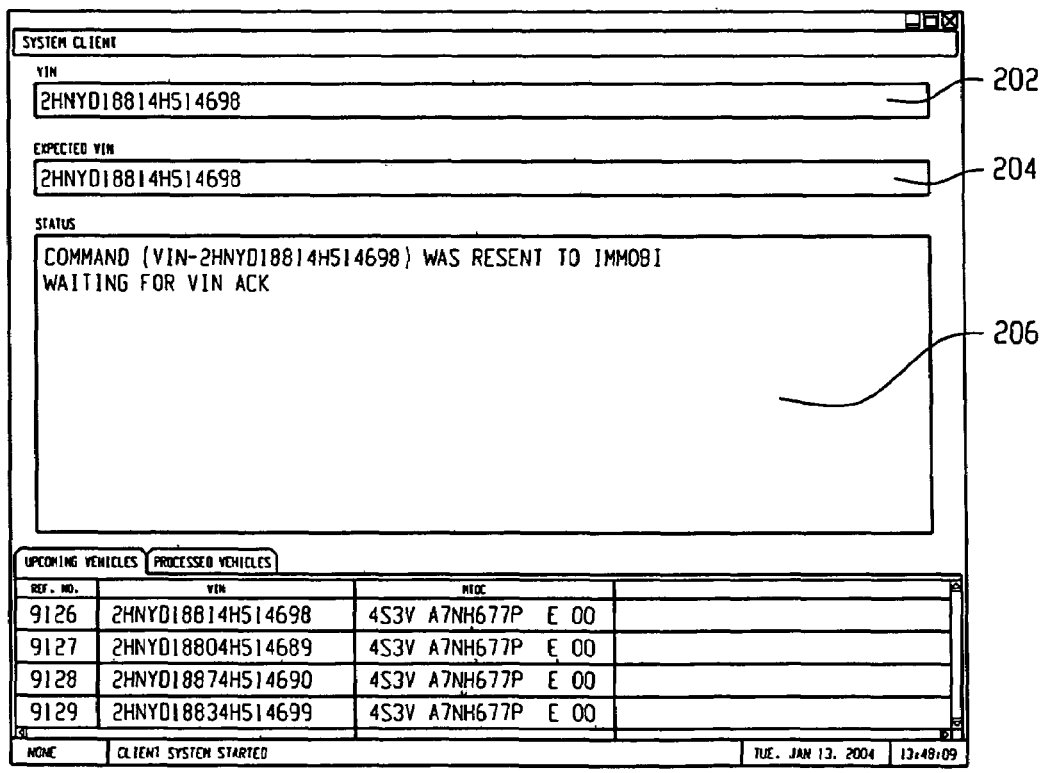
Figure 3H:
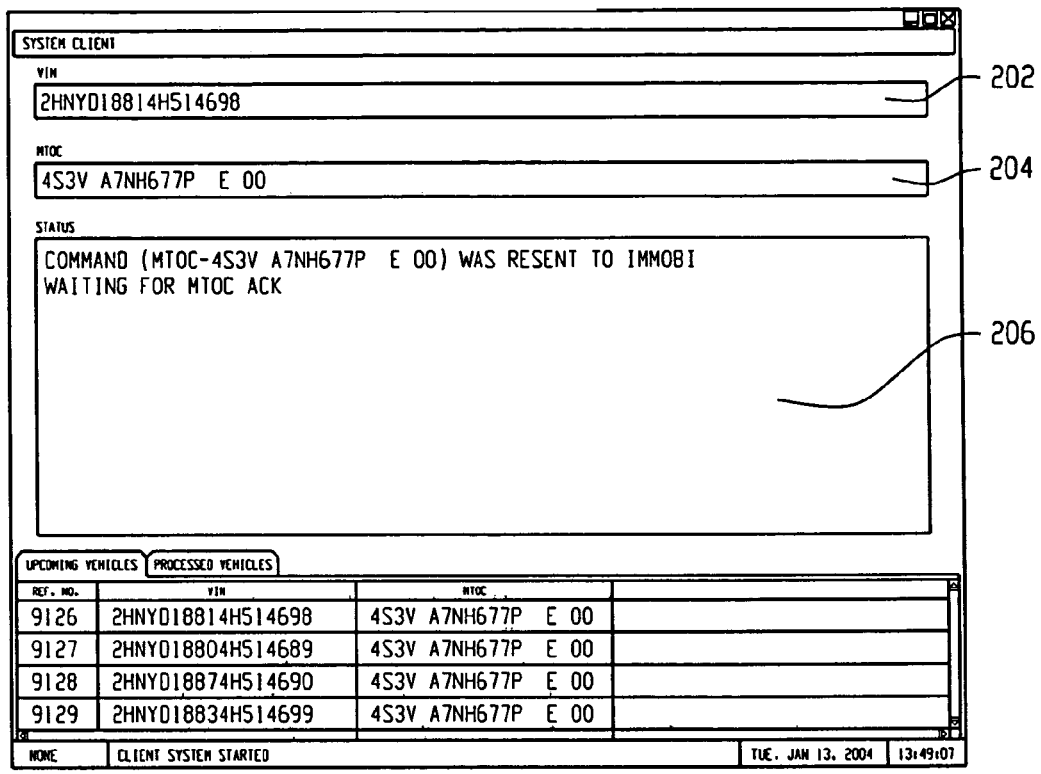

The dialog prompter screen 250 gives the associate the choice of redoing (rescanning) the current VIN, resending the current command, or skipping the current VIN (FIG. 5C). The Rescan VIN button 252 allows the associate to rescan the current VIN by returning the ALC client 20 to the Ready State. The Resend Command button 254 allows the associate to resend the last command sent to the Immobilizer 30. Examples of an ALC client window indicating a resend operational state are shown in FIGS. 3G and 3H. This will cause the Status field 206 at the ALC client 20 to show a resend message accordingly. A Skip VIN button 256 allows the associate to skip the current VIN, marking it in the database 52 as incomplete with a reason of Vehicle Skipped. The ALC client 20 will show the next upcoming VIN in the expected VIN field and return to the Ready State.

Figure 3I:
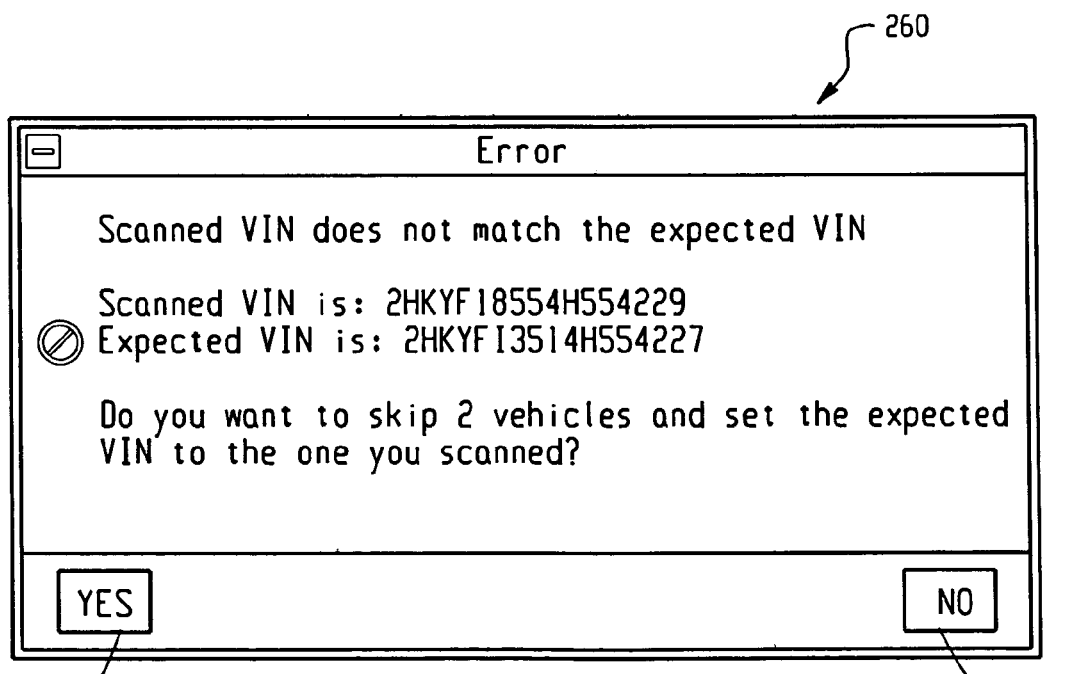
Figure 3J:
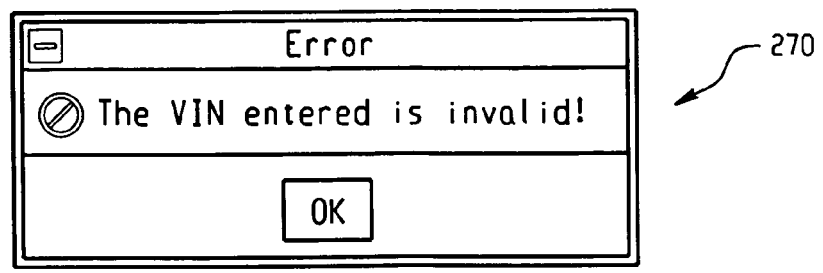
Figure 3K:
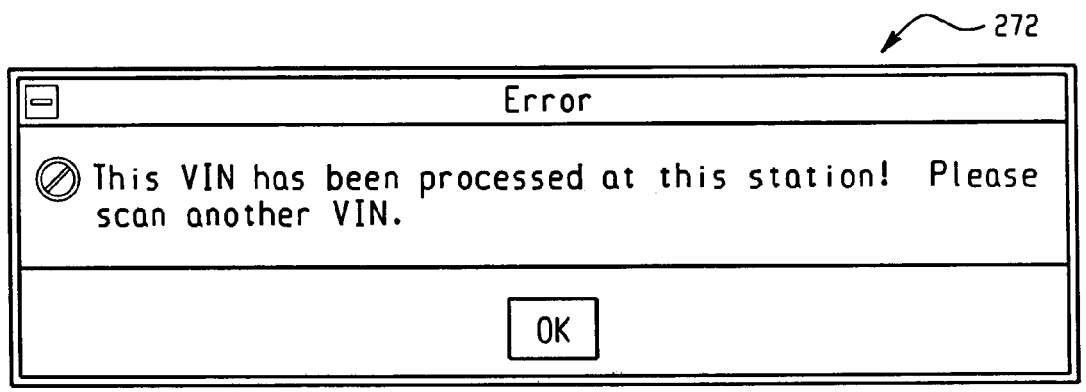
Figure 3L:
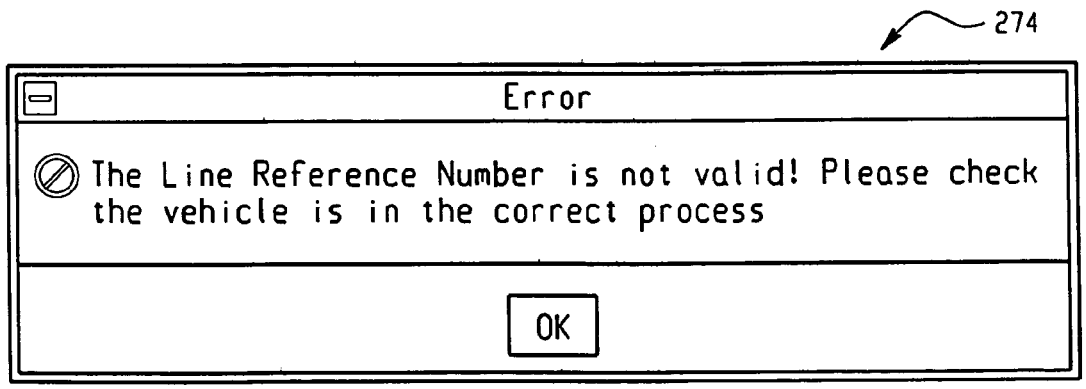
Figure 3M:
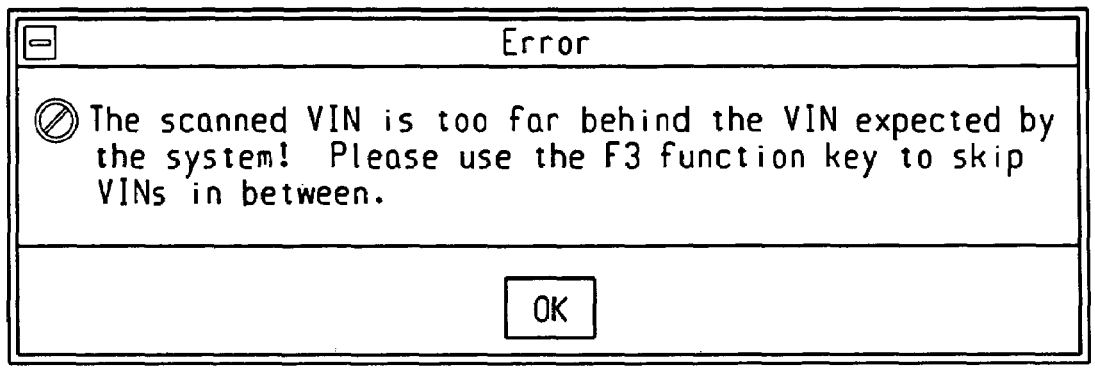

During use of the system in a manufacturing environment, other errors may be expected. For example, in the event that the VIN scanned into the system does not match the expected VIN in the Upcoming Vehicle List (i.e. a valid, not expected VIN (FIG. 5A)) a dialog prompter screen 260 will pop up as shown in FIG. 3I. This dialog prompter screen 260 will alert the associate of this problem, and will ask whether the scanned VIN should be set to the expected VIN, skipping a respective number of vehicles. A Yes button 262 is clicked to accept the scanned VIN, and a No button 264 is clicked to redo (rescan). If the Yes button 262 is selected, the scanned VIN will be accepted and will be immediately sent for processing to the Immobilizer 30. VINs in between will be skipped and marked as incomplete with a reason Vehicle Skipped in ALC database 52.

Further, there could be several types of incorrect scans during the VIN scan process. The ALC client 20 detects the error and suitably prompts the associate of the error. As shown in FIGS. 3J, 3K, 3L and 3M, respective dialog boxes can be displayed indicating: Invalid VIN scan 270; Scanned an already-processed VIN 272; Scan an invalid reference number 274; and Scanned VIN is too far behind 276.

Figure 3N:
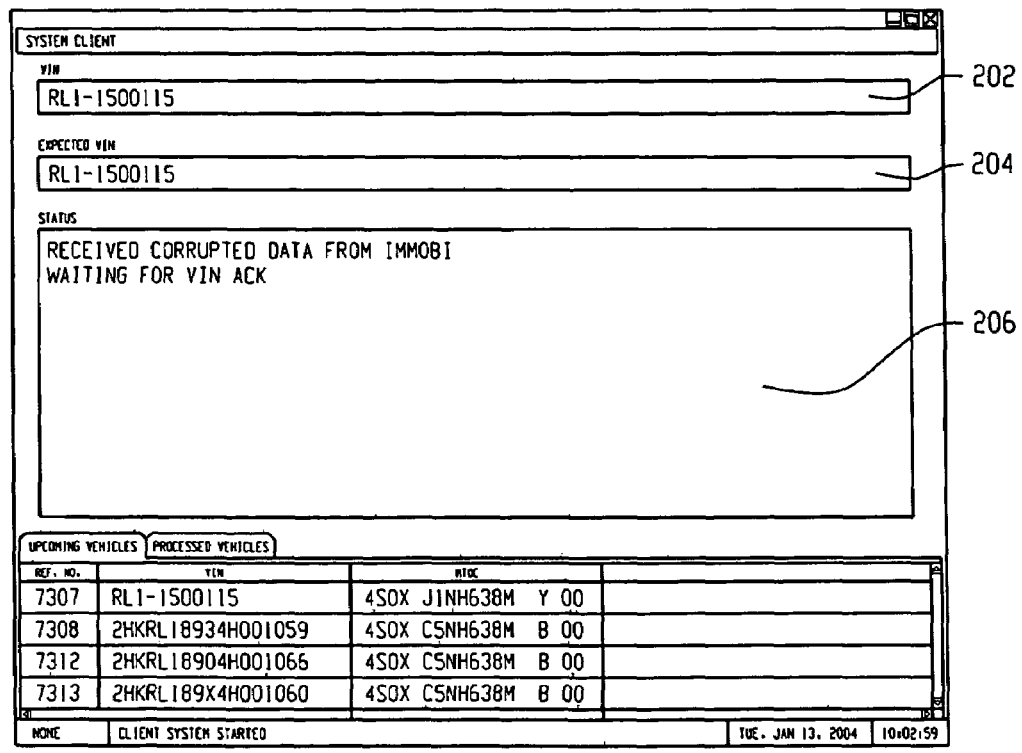
Figure 30:
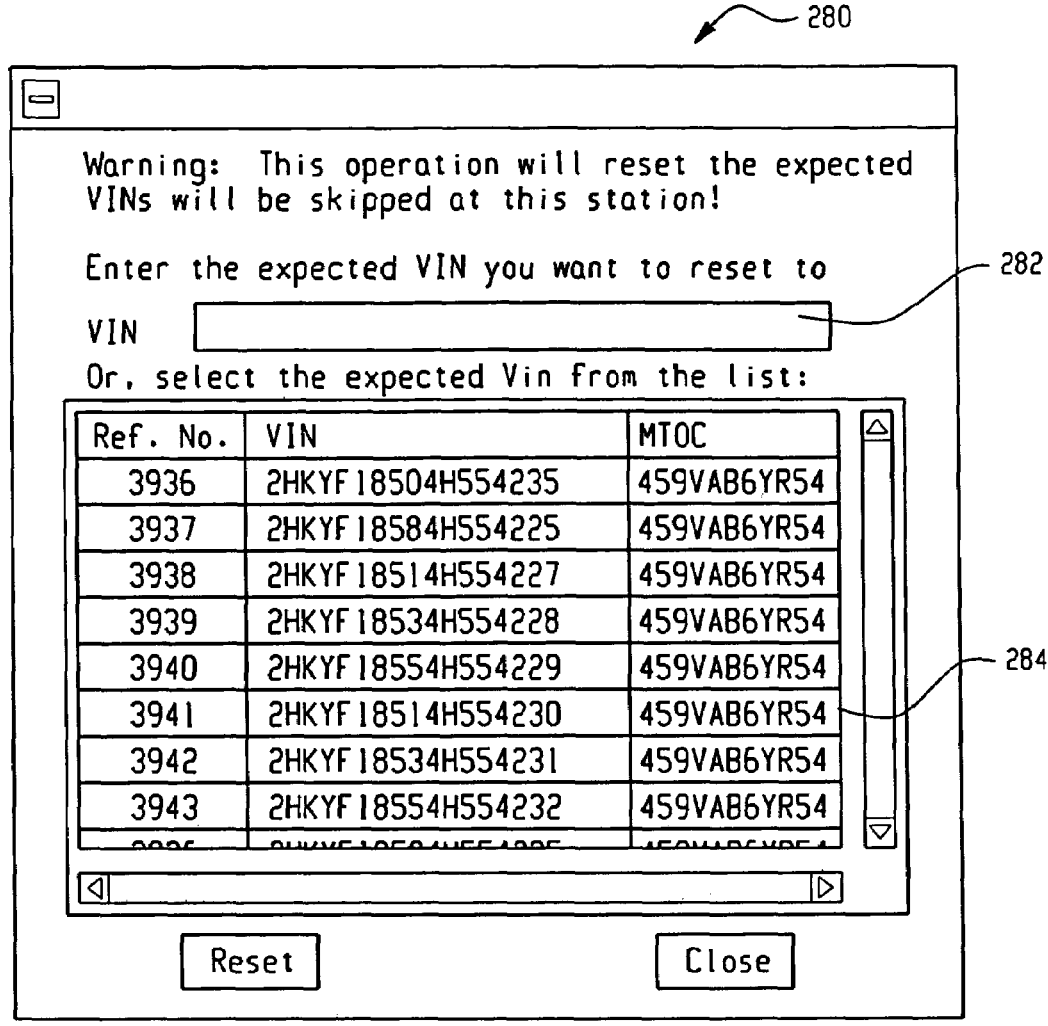

Various transmission errors may occur during the VIN registration process, including corrupted data, out of sequence data and invalid data. Corrupted data are data that are unrecognizable by the ALC client 20. In this situation, the ALC client 20 will display an alert on the screen, and continue to wait for the expected signal in a Wait on ACK (VIN) state, as shown in FIG. 5C. The associate should take the correct action from the Immobilizer 30 by pushing the Complete push button 34a to abort the process. A screen as shown in FIG. 3N is displayed to indicate a corrupted data situation during VIN transmission. Out of sequence data are data that are recognizable but not expected by the ALC client 20. In this situation, the ALC client 20 will display an alert on the screen, and continue to wait for the signal it's expecting. The associate should take the correct action from the Immobilizer 30 by pushing the Complete push button 34a to abort the process. Invalid data is data that is recognizable, in sequence, but are incorrect. ALC client 20 will automatically send a specific NG message to the Immobilizer 30. (One type of "no good" message 154 is shown in FIG. 2I. Other types of "no good" messages are shown in Table 3.) No associate action is required. If the ALC client 20 times out, the F7 function is enabled, as shown in FIG. 5C, and an Enable Operator IRQ state is enabled where various suitable messages can be displayed in the GUI interface of the ALC client 20 to allow skip/redo/resend actions to be taken corresponding to these respective contingencies. It should be appreciated that that similar corresponding contingency procedures are performed during the Sending MTOC and Doing Registration procedures, as indicated in FIGS. 5D and 5E.

With the present method, the Immobilizer 30 has its own procedure to handle transmission errors. If the Immobilizer 30 receives corrupted data from the ALC client 20, it shows ERR on screen and sends out an ERR message 156 to the ALC client 20 as shown in FIG. 2J. In response to the ERR message, the ALC client 20 will automatically resend its last command to the Immobilizer 30. The Immobilizer 30 could request ALC client to resend by sending out ERR to it up to two times. If a corrupted data problem still exists, the Immobilizer 30 enables a Reset push button 34b on the Immobilizer 30. This Reset button 34b allow the associate to resend the Immobilizer's 30 last command to the ALC client 20, instructing the ALC client 20 to resend its last command. The Immobilizer 30 also enables the Complete push button 34a to allow the associate to abort the registration process. If the Immobilizer 30 receives out of sequence data from the ALC client 20, an error is shown on the Immobilizer's 30 screen and the Complete push button 34a is enabled to allow the associate to abort. If the Immobilizer 30 receives a specific NG signal from the ALC client 20, it shows NG on screen and enables the Complete push button 34a to allow the associate to abort. If the Immobilizer 30 times out while awaiting a signal from the ALC client 20, it shows timeout on the screen and enables the Reset push button 34b and the Complete push button 34a to allow the associate to resend or abort.

In the event of a situation where the ALC network is down, the Immobilizer 30 can be run in Stand Alone Mode, as shown in FIG. 1D. Once the ALC network is back up and running, the associates will switch back to the normal networked ALC Mode. This requires the associate to reset the expected VIN in the ALC client 20. To do so, the associate can click on the F3 function key when the ALC client 20 is in its Ready State. As shown in FIG. 3O, a dialog prompter 280 will pop up to update the expected VIN field on the screen to the newly selected VIN. The associate can scan or enter a long or short VIN in the Enter VIN to reset to: field 282 or select a VIN from the VIN list 284. Once the VIN has been entered or selected a Reset button 286 is enabled, an associate can then click on the Reset button 286. A dialog prompter screen 290, as shown in FIG. 3P, will pop up asking the associate to confirm the expected VIN. Selecting the Yes button will reset the VIN while selecting the No button will cancel the operation. If Yes is selected, once the operation is complete, a message prompter will show up notifying the associate that the VIN was reset successfully.

The present method also includes ALC terminal server reset detection. As indicated in FIG. 1C, a digital terminal server 76, preferably one of the products sold by Digi International Inc. of Minnetonka, Minn., is used to connect between the ALC client 20 and the Immobilizer station 30. The terminal server 76 acts as a converter between the RS232C transmission protocol used by the Immobilizer station 30 and the Internet Protocol used by the ALC system. Occasionally, the terminal server 76 could reset itself (e.g., due to a loose power connection), causing a communication loss between the two components. This could happen if the ALC client 20 is launching, if the ALC client 20 is writing data to the Immobilizer 30, or if the ALC client 20 is reading data from the Immobilizer 30. The ALC client 20 will detect the error and prompt the associates to switch to Stand Alone Mode.

If the ALC client 20 loses connection to the ALC Object Server for whatever reason, the client 20 will not be able to operate. The GUI will be disabled and the Status field will display a message indicating "Lost Connection to Object Server. Contact ISD immediately." Upon reconnection to the Object Server, the client 20 will go back to the Ready State, without changing the expected VIN. Depending on the situation, the associate may need to reset the expected VIN, as described above.

As described hereinabove, the present embodiments provide a protocol for registering a vehicle VIN and associated data to a vehicle ECU while storing the data in a central database. In this way, the present invention solves many problems associated with previous type devices. However, it will be appreciated that various changes in the details, materials and arrangements of parts, which have been herein described and illustrated in order to explain the nature of the invention, may be made by those skilled in the art without departing from the principle and scope of the invention, as expressed in the appended claims.

What is claimed:

1. A method of registering data associated with a vehicle, comprising the steps of:
   entering a vehicle identification number into an assembly line control client of a production control system that is connected to a network;
   comparing the entered vehicle identification number with an expected vehicle identification number from a database of an assembly line control server;
   if a match is obtained between the entered and expected vehicle identification numbers, sending the vehicle identification number and an associated information record from the assembly line control client of the production control system to a vehicle Immobilizer, wherein the assembly line control client communicates with the database and the Immobilizer; and
   writing the vehicle identification number and the associated information record from the Immobilizer into an electronic control unit incorporated into the vehicle.

2. The method of claim 1, wherein the step of entering a vehicle identification number comprises scanning the vehicle identification number from a bar code associated with the vehicle.

3. The method of claim 1, wherein the information record comprises information on a model, a type and options associated with the vehicle.

4. The method of claim 1, wherein the assembly line control client communicates between the Immobilizer and the network.

5. The method of claim 1 wherein, prior to the step of writing, performing the steps of:
   establishing a communications connection between the vehicle Immobilizer and the electronic control unit;
   turning on the vehicle so as to enable the electronic control unit; and
   actuating the Immobilizer to initiate the step of writing.

6. The method of claim 5 wherein, subsequent to the step of writing, performing the steps of:
   reading back the vehicle identification number and the information record from the electronic control unit and sending them back to the production control system for verification;
   if the sent vehicle identification number and the information record match those of the production control system:
   sending a complete message from the Immobilizer to the production control system;
   recording a VIN registration record in a central database;
   disconnecting the communications connection between the vehicle Immobilizer and the electronic control unit; and
   turning off the vehicle so as to disable the electronic control unit.

7. A method of registering data associated with a vehicle, comprising the steps of:
   entering a vehicle identification number into an assembly line control client of a production control system that is connected to a network;
   comparing the entered vehicle identification number with an expected vehicle identification number from a database of an assembly line control server;
   if a match is obtained between the entered and expected vehicle identification numbers, sending the vehicle identification number from the assembly line control client of the production control system to a vehicle Immobilizer, wherein the assembly line control client communicates with the database and the Immobilizer;

receiving a vehicle identification number acknowledgement at the production control system from the vehicle Immobilizer;

sending an information record associated with the vehicle identification number from the production control system to the vehicle Immobilizer;

receiving an information record acknowledgement at the production control system from the vehicle Immobilizer;

sending an authorization message from the production control system to the vehicle Immobilizer;

writing the vehicle identification number and the associated information record from the vehicle Immobilizer into an electronic control unit incorporated into the vehicle in response to the authorization message.

8. The method of claim 7, wherein the step of entering a vehicle identification number comprises scanning the vehicle identification number from a bar code associated with the vehicle.

9. The method of claim 7, wherein the information record comprises information on a model, a type and options associated with the vehicle.

10. The method of claim 7, wherein the assembly line control client communicates between the Immobilizer and the network.

11. The method of claim 7 wherein, prior to the step of writing, performing the steps of:
establishing a communications connection between the vehicle Immobilizer and the electronic control unit;
turning on the vehicle so as to enable the electronic control unit; and
actuating the Immobilizer to initiate the step of writing.

12. The method of claim 11 wherein, subsequent to the step of writing, performing the steps of:
reading back the vehicle identification number and the information record from the electronic control unit and sending them back to the production control system for verification;
if the sent vehicle identification number and the information record match those of the production control system:
sending a complete message from the Immobilizer to the production control system;
recording a VIN registration record in a central database; and
updating the expected vehicle identification number to correspond with a subsequent vehicle.

13. A system for registering vehicle data comprising:
an assembly line control client of a production control system that is connected to a network and to an entering implementation;
a vehicle Immobilizer for encoding data into an electronic control unit incorporated into a vehicle;
the entering implementation for entering a vehicle identification number into the assembly line control client of the production control system;
a sending implementation including an RS232C interface, incorporated into the production system, for sending the vehicle identification number and an associated information record from the production control system to the vehicle Immobilizer; and
a writing implementation including a communications connection, incorporated into the vehicle Immobilizer, for writing the vehicle identification number and the associated information record from the vehicle Immobilizer into the electronic control unit,
the production control system further comprising:
a comparing implementation including the assembly line control client, for comparing the entered vehicle identification number entered with the entering implementation with an expected vehicle identification number from a database of an assembly line control server, wherein the assembly line control client communicates with the database and the Immobilizer; and
a determining implementation for determining if a match is obtained between the entered and expected vehicle identification numbers, and for instructing the sending implementation to send the vehicle identification number and the associated information record to the vehicle immobilizer.

14. The system of claim 13 further comprising:
the database for retaining a pre-populated table of expected vehicle identification numbers and associated information records, for supplying the expected vehicle identification numbers to the comparing implementation;
an updating implementation for updating the expected identification number after the writing implementation writes the vehicle identification number and the associated information record from the vehicle Immobilizer into the electronic control unit.

15. The system of claim 14 further comprising a network system for retaining the database and a client device for communicating with the vehicle Immobilizer.

16. The system of claim 13 wherein the entering implementation comprises a bar code scanner scanning the vehicle identification number from a bar code associated with the vehicle.

17. The system of claim 13 wherein the information record comprises information on a model, a type and options associated with the vehicle.

18. The system of claim 13 wherein the assembly line control client communicates between the Immobilizer and the network.

19. The system of claim 13 wherein the writing implementation comprises:
a pushbutton actuator for actuating the Immobilizer to initiate the writing implementation.

20. The system of claim 13 further comprising:
a network system for monitoring vehicle production and providing a data set of expected vehicle identification numbers and associated information records to the production control system.

21. The system of claim 20, wherein the production control system further comprises:
a comparing implementation for comparing the entered vehicle identification number with an expected vehicle identification number; and
a determining implementation for determining if a match is obtained between the entered and expected vehicle identification numbers, and for instructing the sending implementation to send the vehicle identification number and the associated information record to the vehicle Immobilizer.

22. The system of claim 21 wherein the network system further comprises:
the database for retaining a pre-populated table of the expected vehicle identification numbers and the associated information records for supplying expected vehicle identification numbers to the comparing implementation;

an updating implementation for updating the expected identification number after the writing implementation writes the vehicle identification number and the associated information record from the vehicle Immobilizer into the electronic control unit.

23. The system of claim 20 wherein the entering implementation comprises a bar code scanner scanning the vehicle identification number from a bar code associated with the vehicle.

24. The system of claim 20 wherein the information record comprises information on a model, a type and options associated with the vehicle.

25. The system of claim 20 wherein the assembly line control client communicates between the Immobilizer and the network.

26. The system of claim 20 wherein the writing implementation comprises:

a pushbutton actuator for actuating the Immobilizer to initiate the writing implementation.

* * * * *